June 27, 1961

M. K. BUCHNER ET AL 2,989,997

PEAR ORIENTATING, FEEDING, PEELING, SEED CELLING, BUTT TRIMMING, BOBBING, AND SPLITTING MACHINE

Filed Oct. 23, 1957

INVENTORS
CLARENCE R. THOMPSON
MARVIN K. BUCHNER
BY

*Prangley, Baird, Clayton, Miller & Vogel*
Attys.

INVENTORS:
CLARENCE R. THOMPSON
MARVIN K. BUCHNER

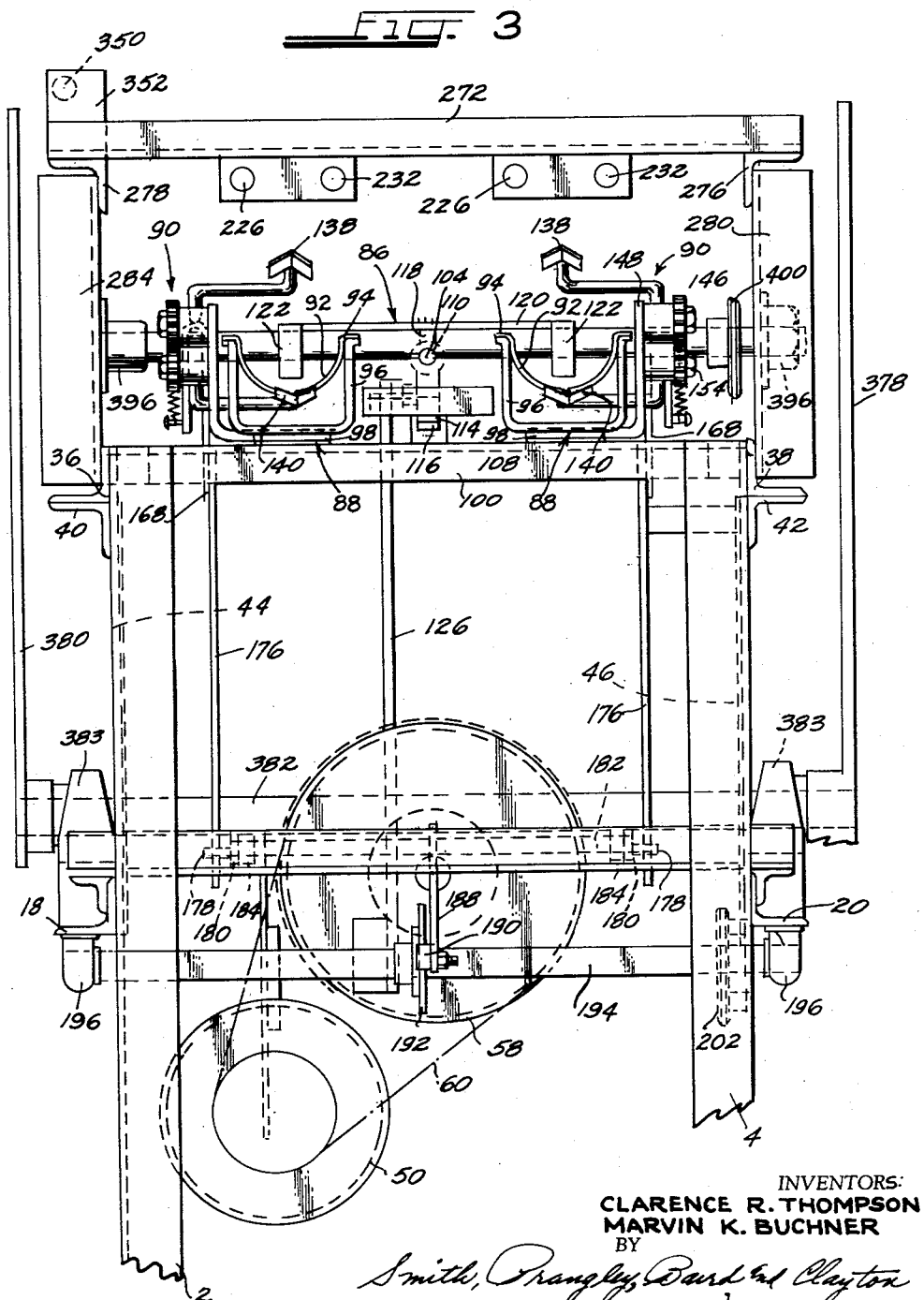

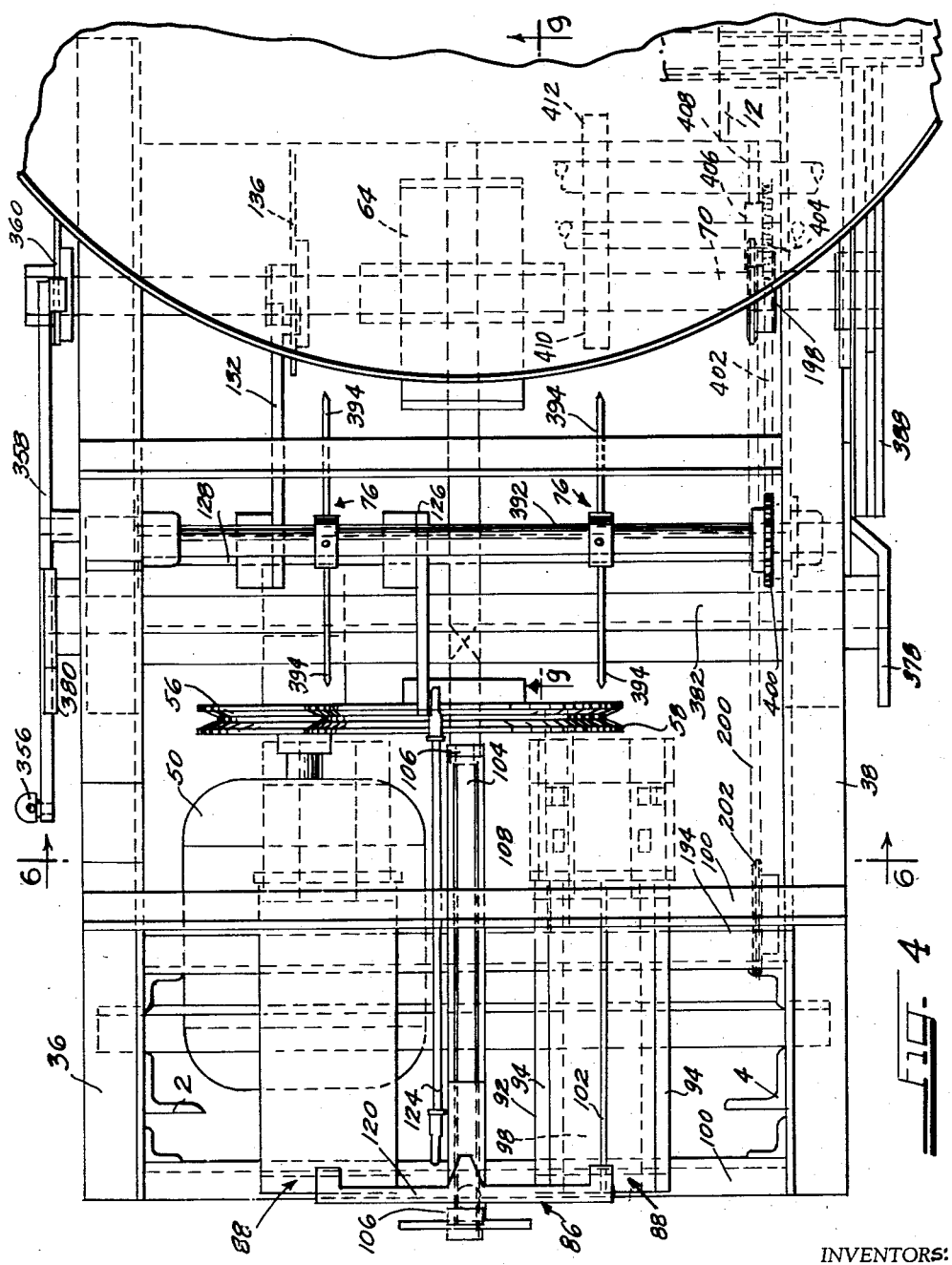

June 27, 1961
M. K. BUCHNER ET AL
2,989,997
PEAR ORIENTATING, FEEDING, PEELING, SEED CELLING, BUTT TRIMMING, BOBBING, AND SPLITTING MACHINE
Filed Oct. 23, 1957
25 Sheets-Sheet 5
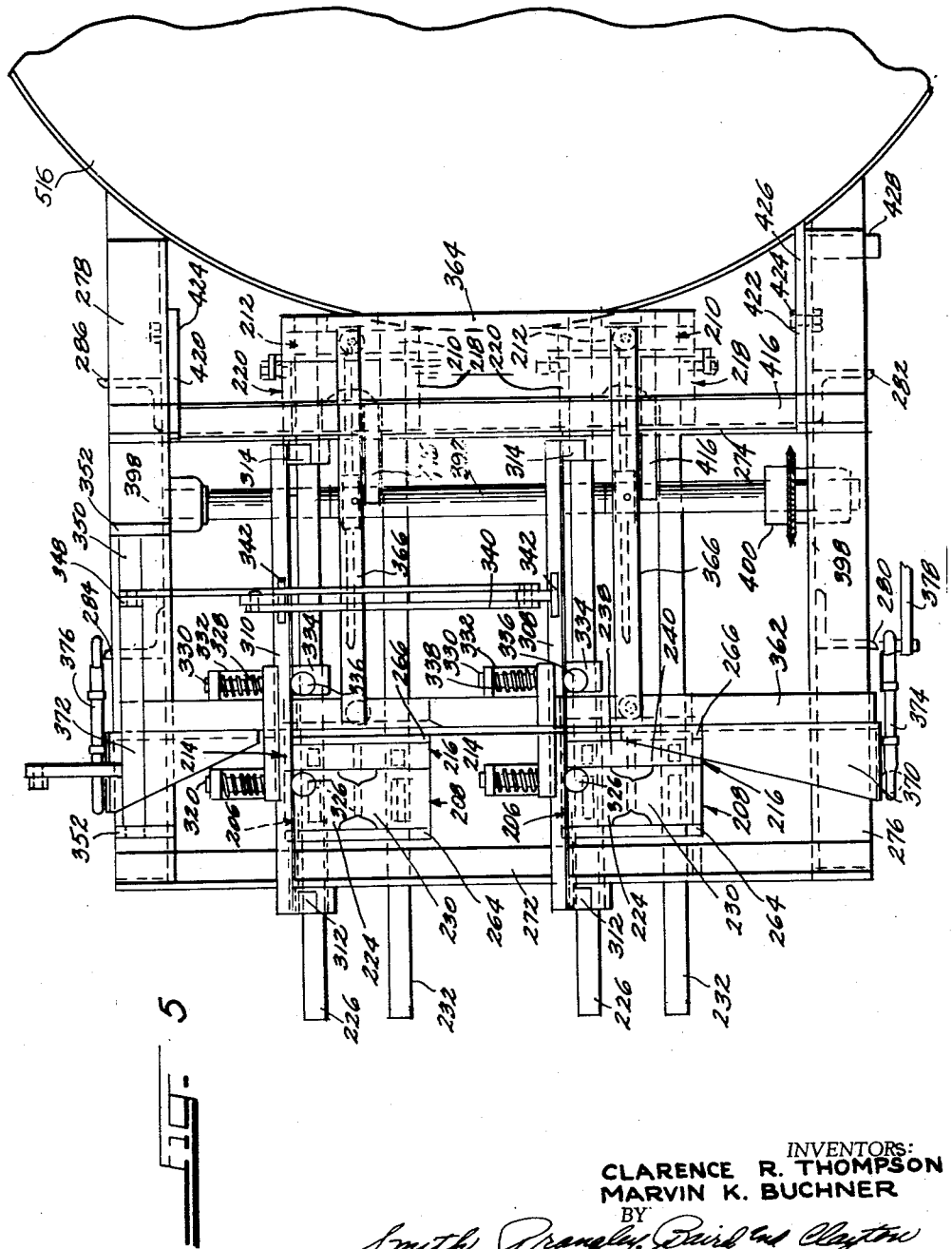
INVENTORS:
CLARENCE R. THOMPSON
MARVIN K. BUCHNER June 27, 1961
M. K. BUCHNER ET AL
2,989,997
PEAR ORIENTATING, FEEDING, PEELING, SEED
CELLING, BUTT TRIMMING, BOBBING, AND
SPLITTING MACHINE
Filed Oct. 23, 1957
25 Sheets-Sheet 6
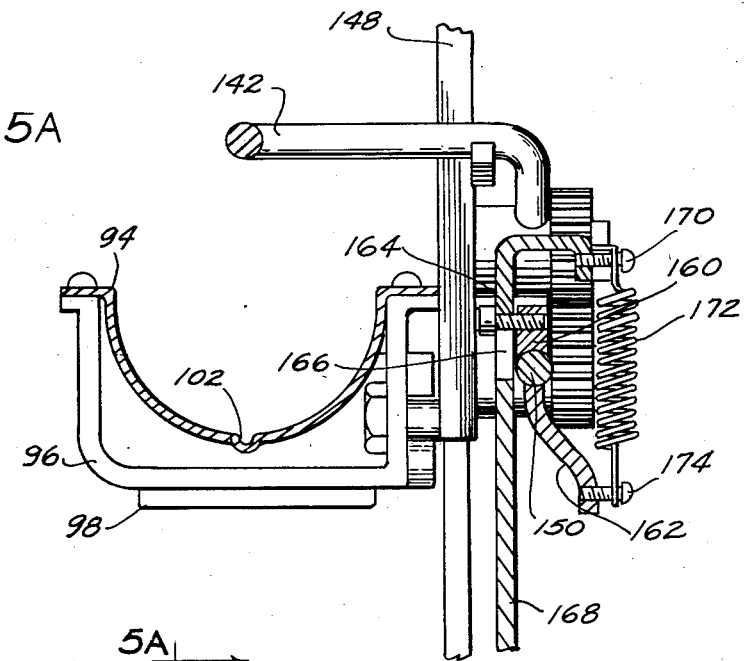
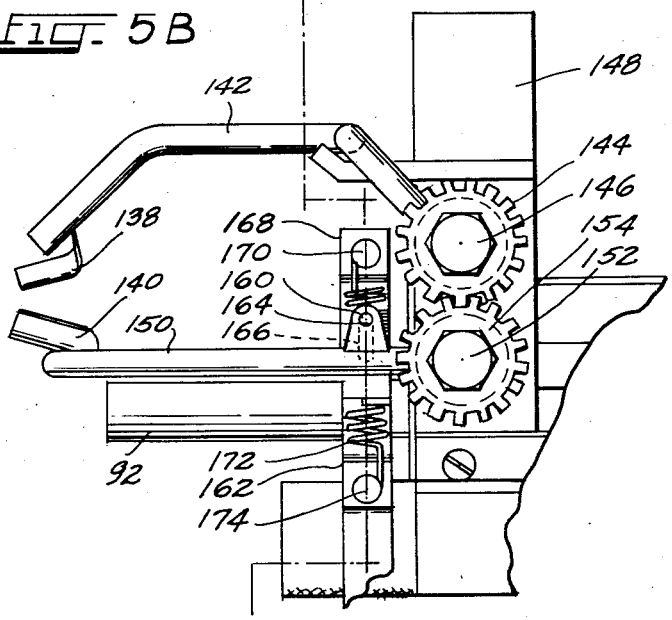
INVENTORS:
CLARENCE R. THOMPSON
MARVIN K. BUCHNER June 27, 1961
M. K. BUCHNER ET AL
2,989,997
PEAR ORIENTATING, FEEDING, PEELING, SEED CELLING, BUTT TRIMMING, BOBBING, AND SPLITTING MACHINE
Filed Oct. 23, 1957
25 Sheets-Sheet 7
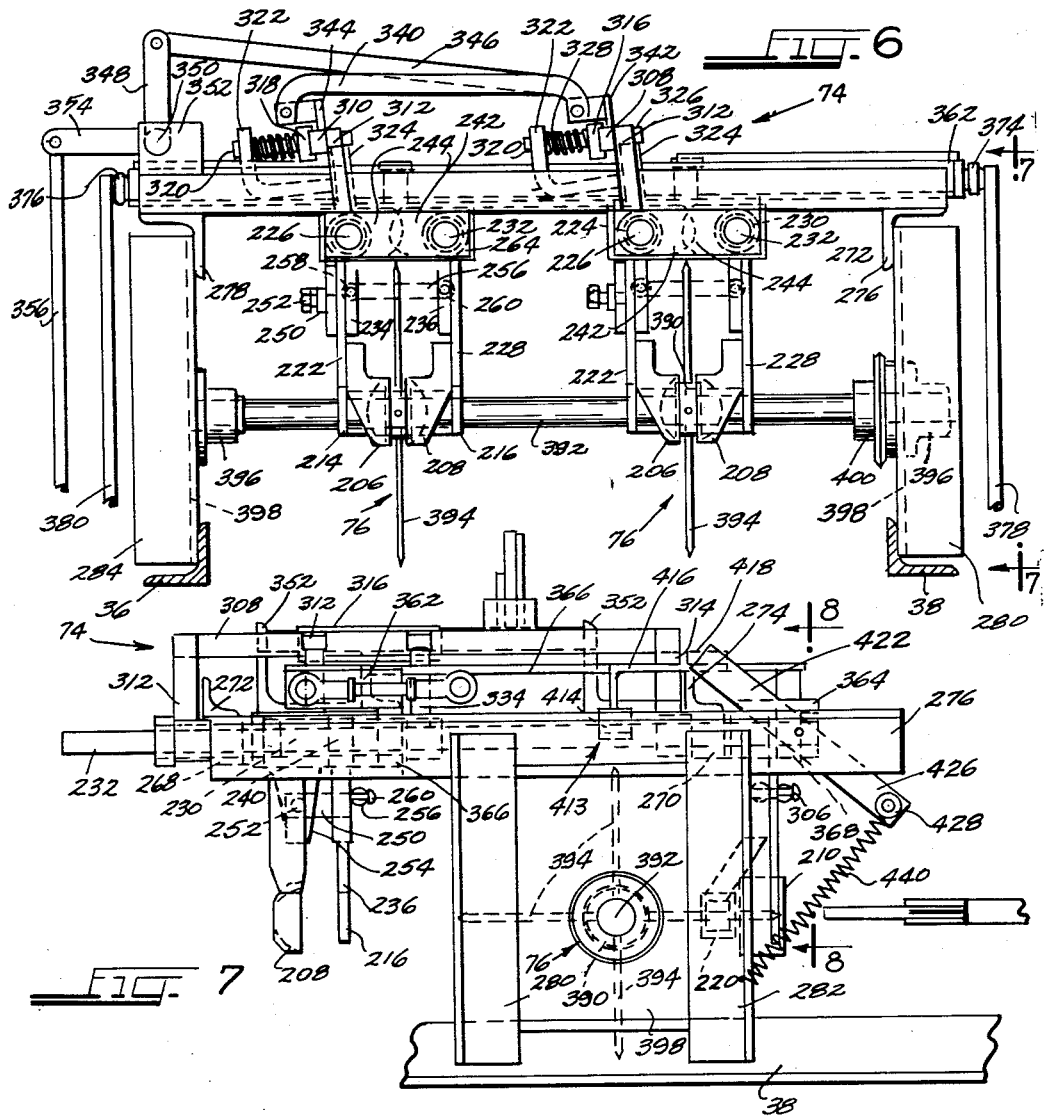
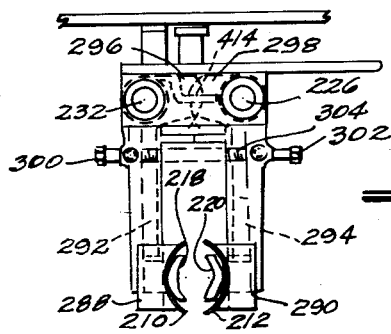
INVENTORS:
CLARENCE R. THOMPSON
MARVIN K. BUCHNER
BY
Smith, Graughy, Baird, and Clayton
ATTYS.

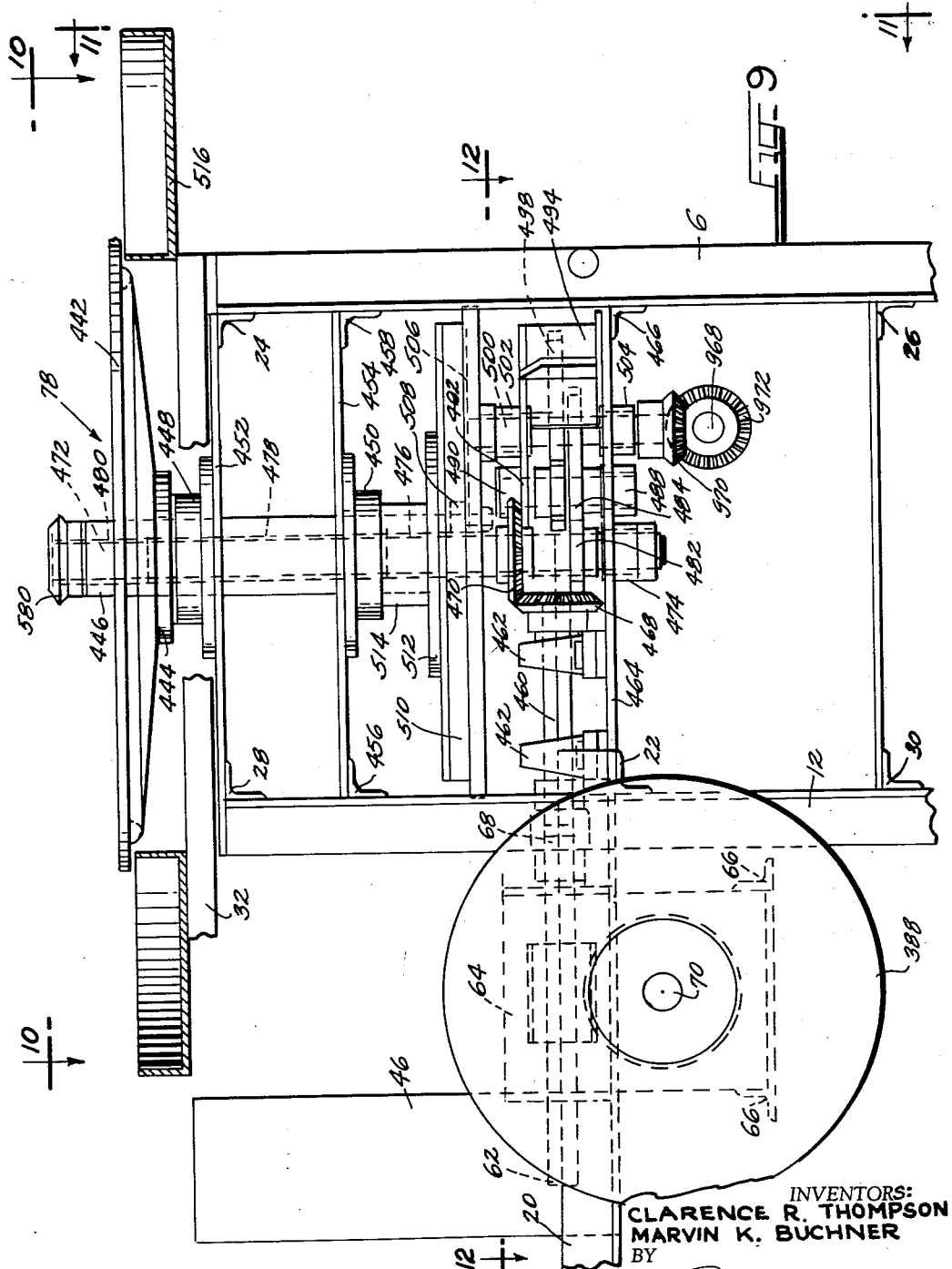

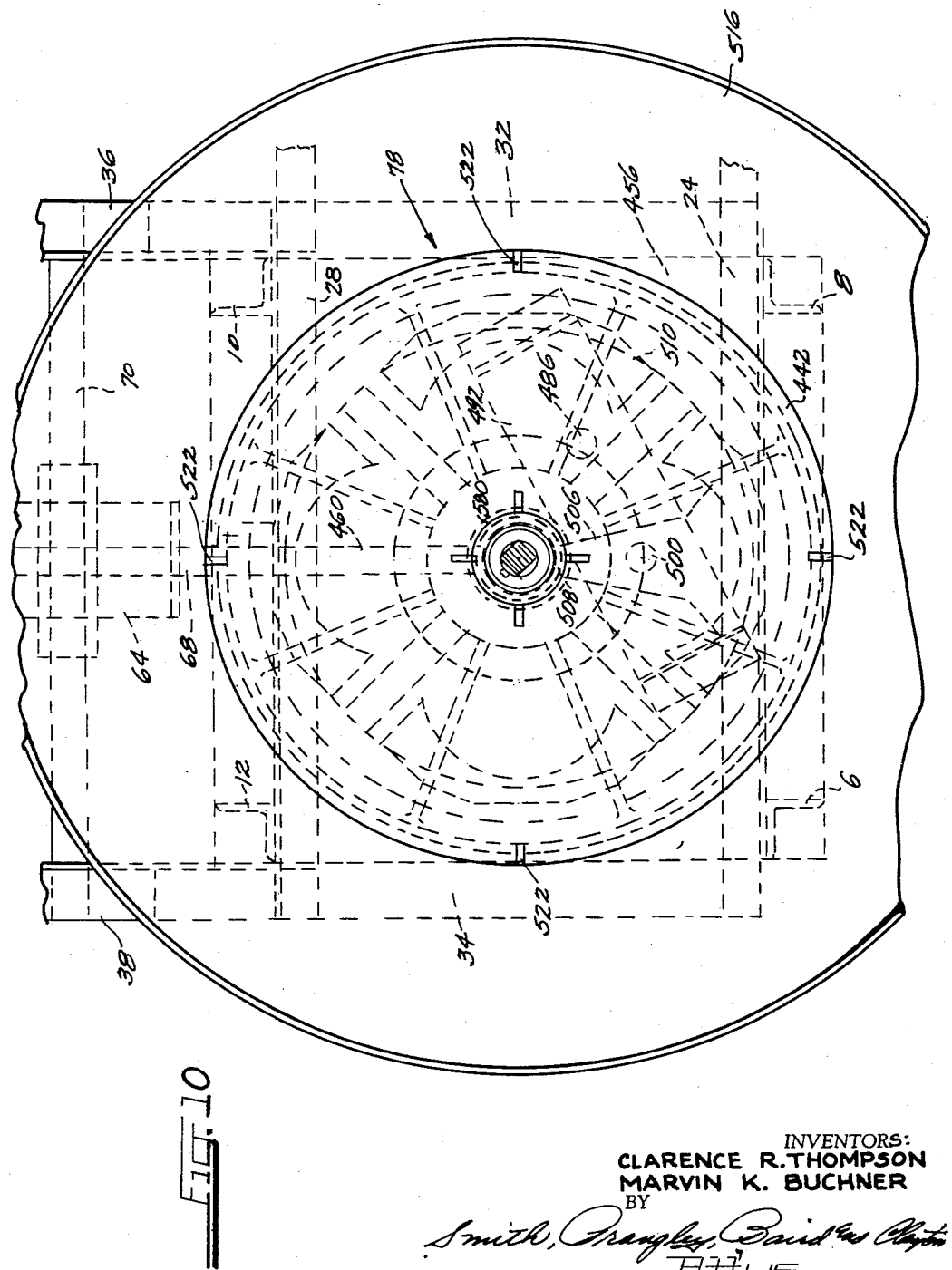

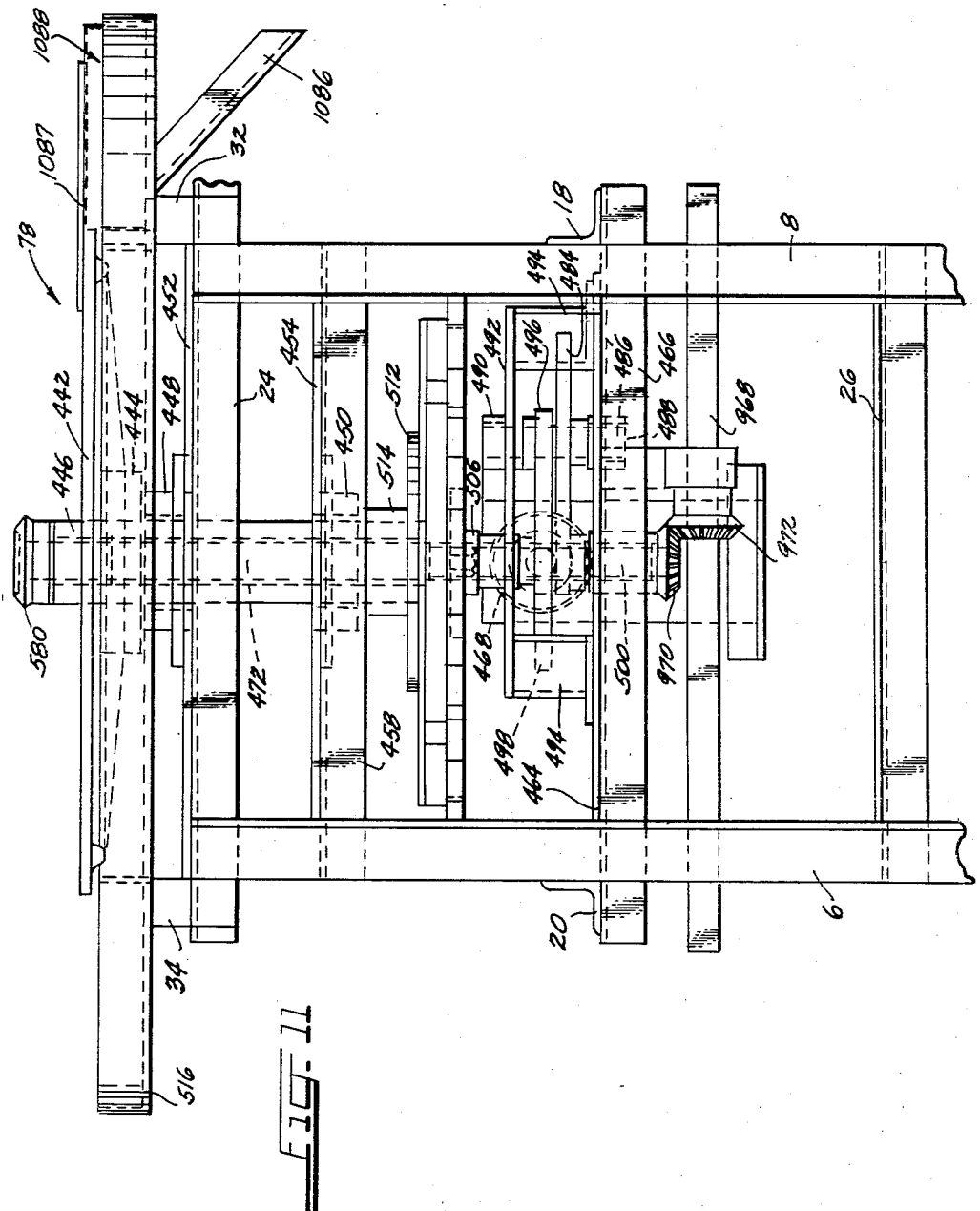

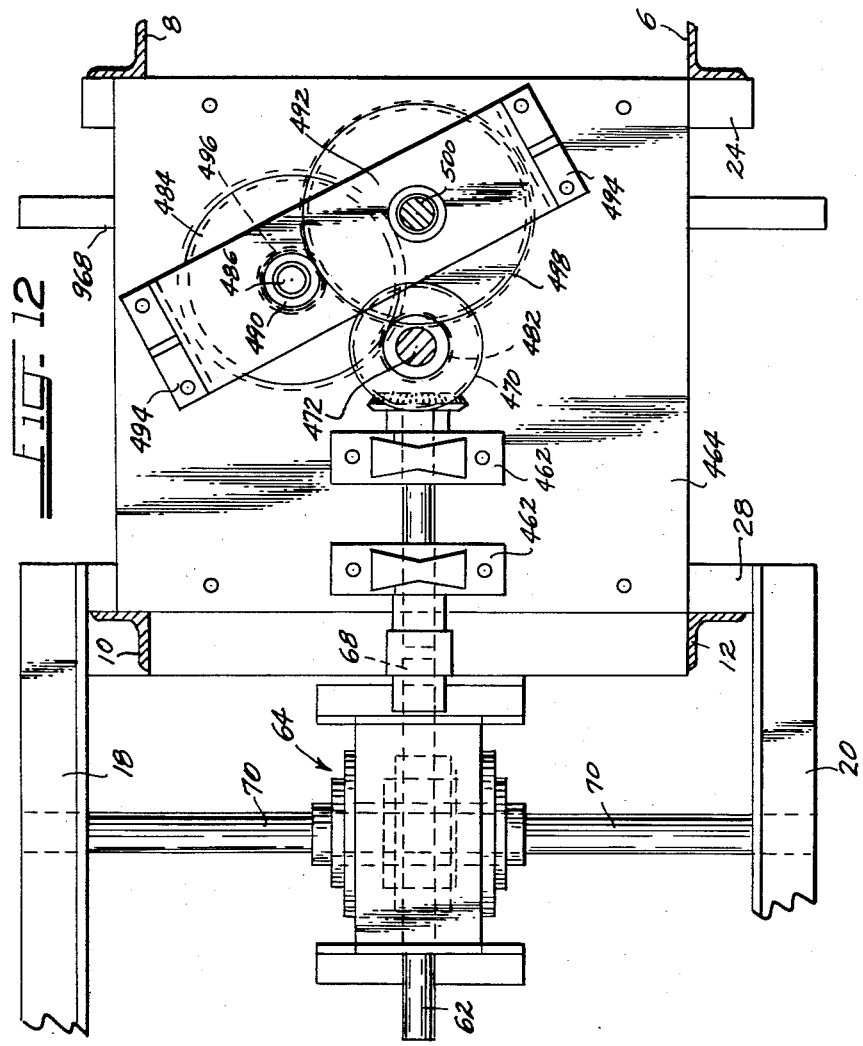

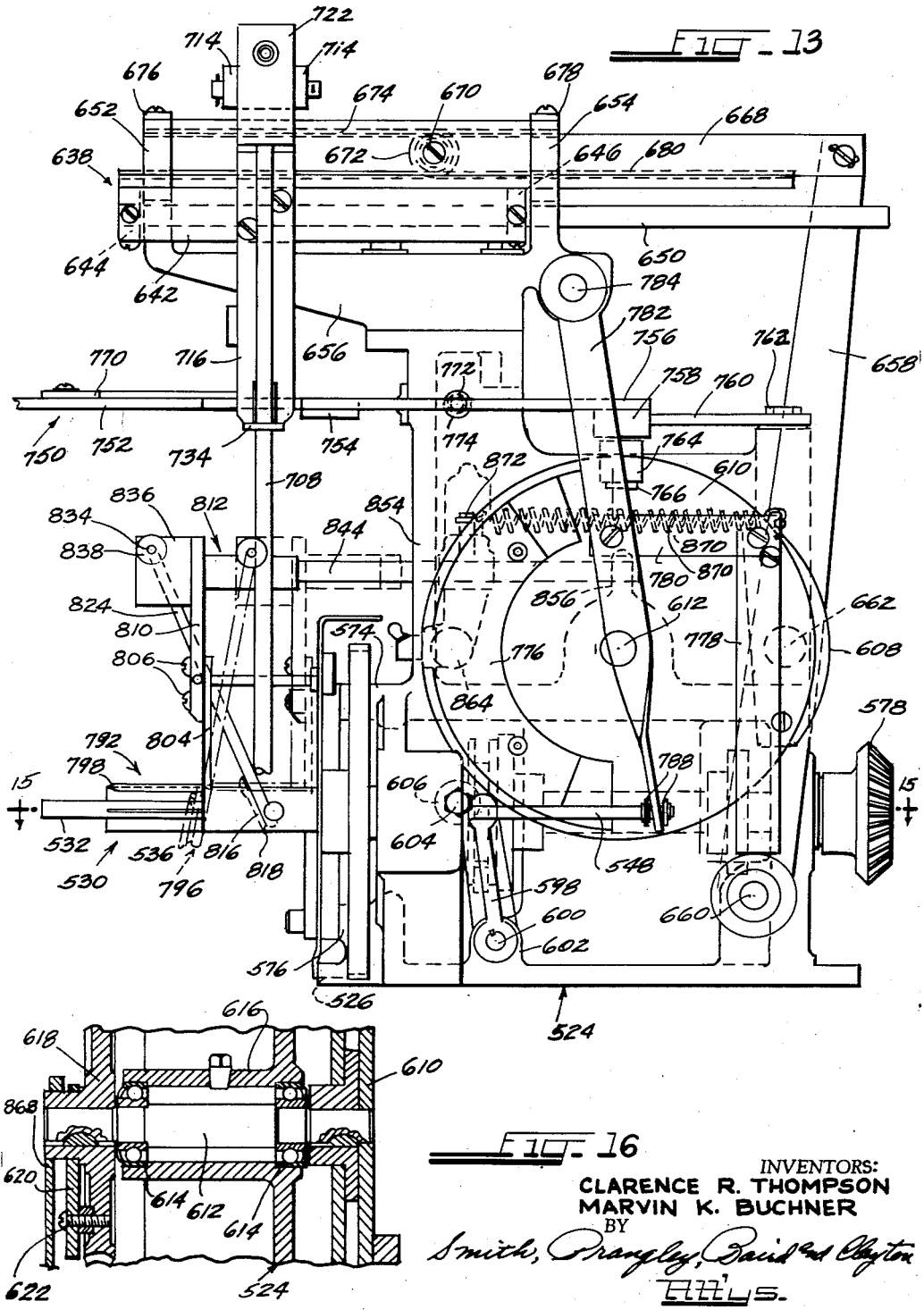

June 27, 1961

M. K. BUCHNER ET AL 2,989,997

PEAR ORIENTATING, FEEDING, PEELING, SEED CELLING, BUTT TRIMMING, BOBBING, AND SPLITTING MACHINE

Filed Oct. 23, 1957

INVENTORS
CLARENCE R. THOMPSON
MARVIN K. BUCHNER
BY
Prangley, Baird, Clayton, Miller & Vogel.
Attys.

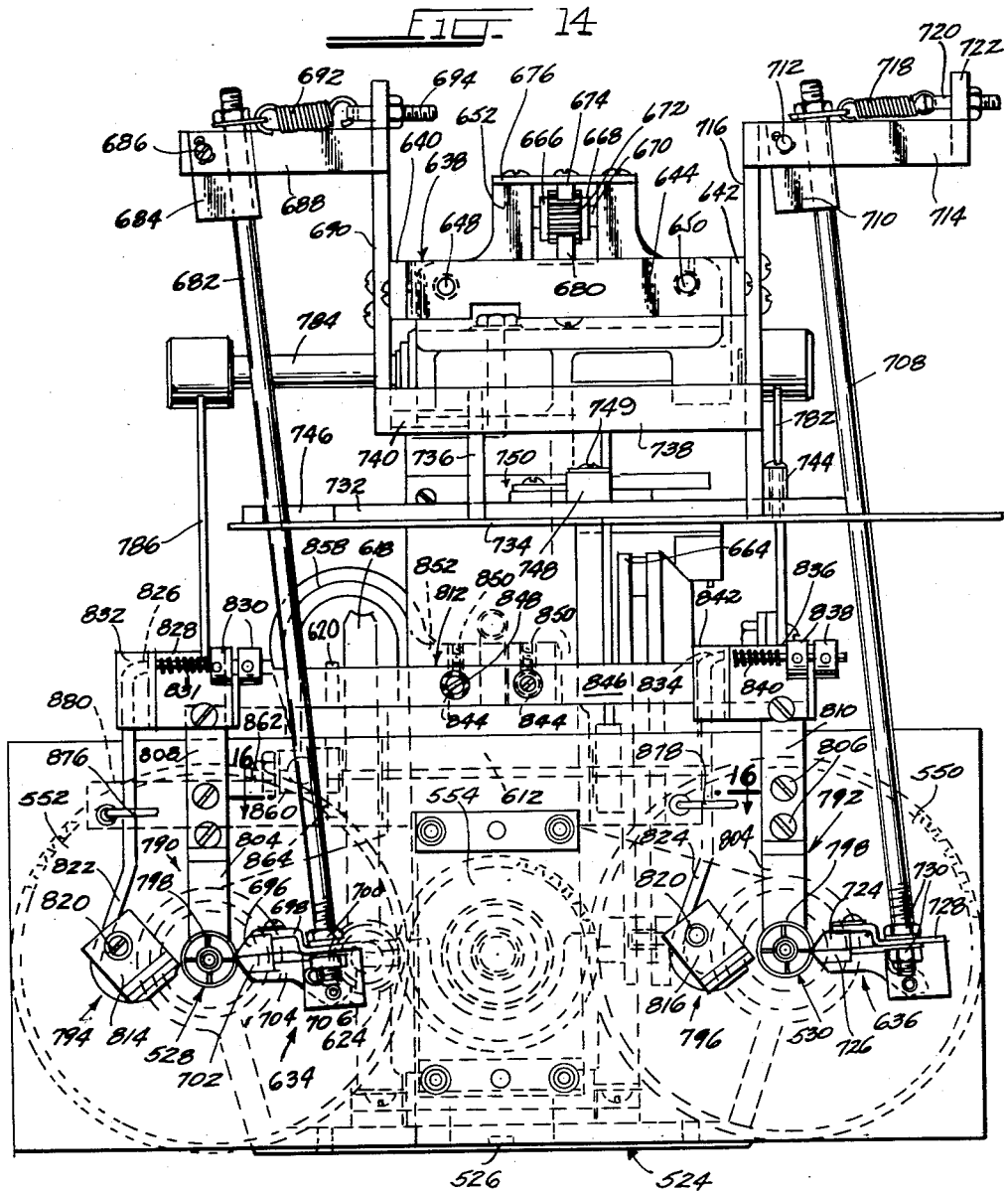

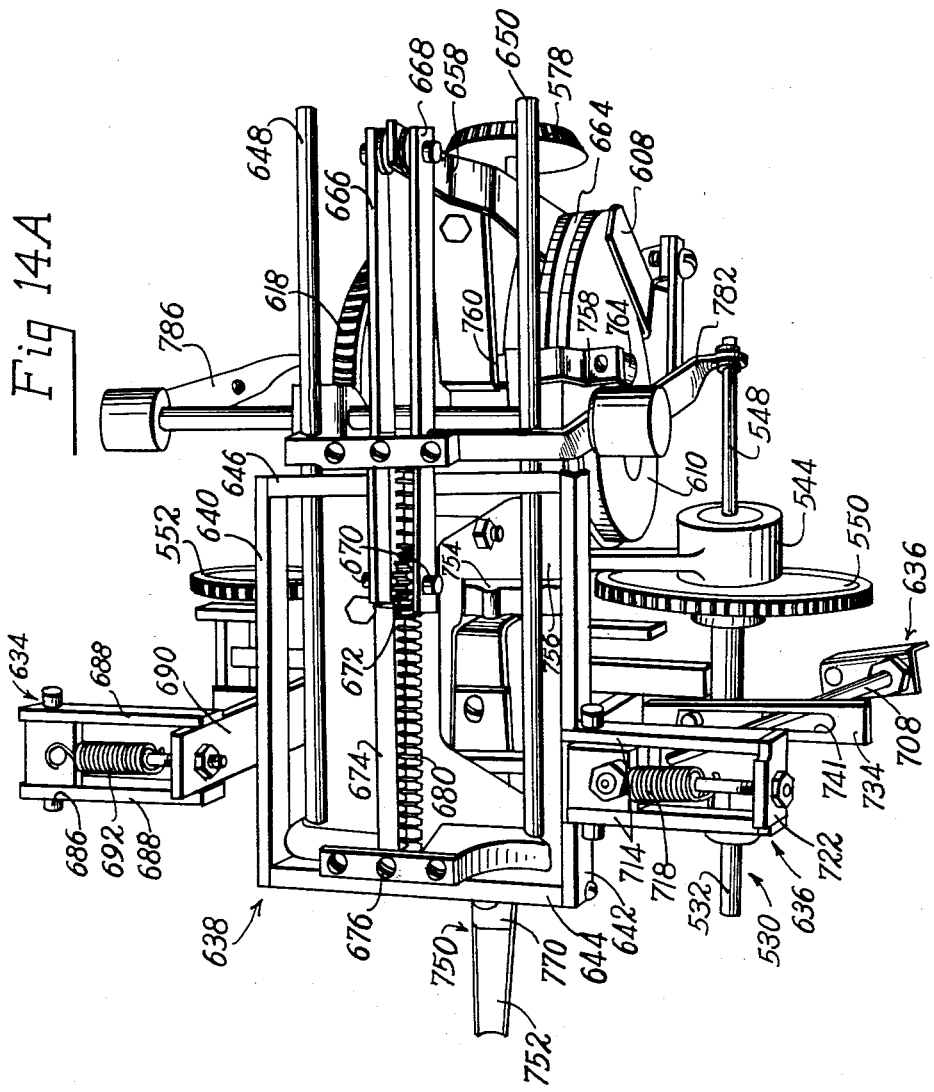

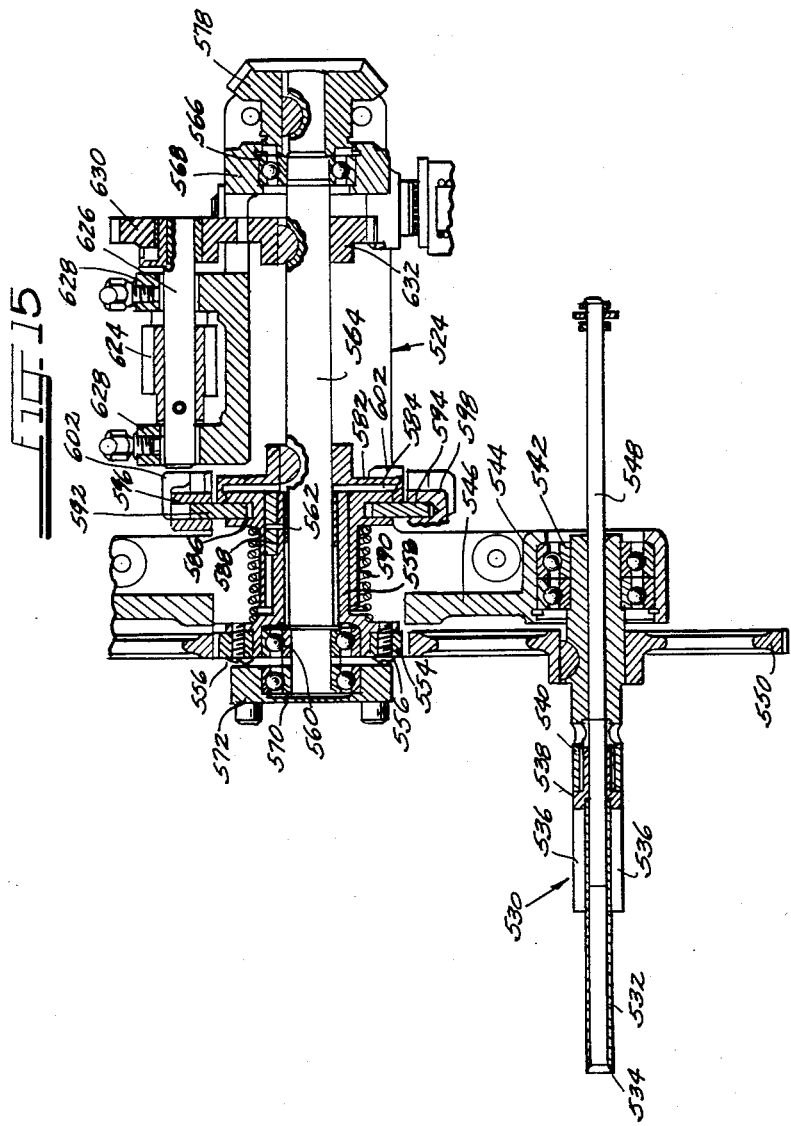

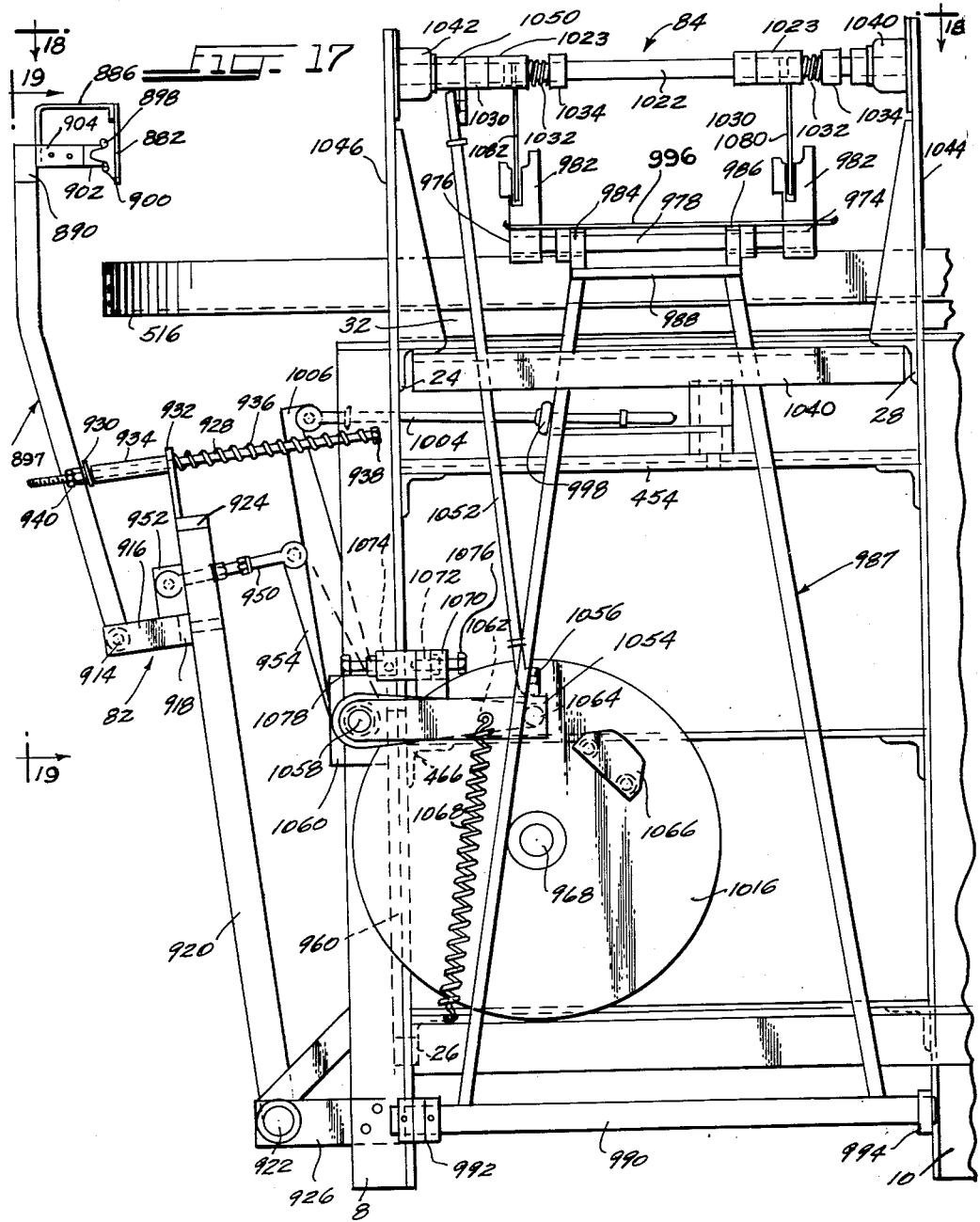

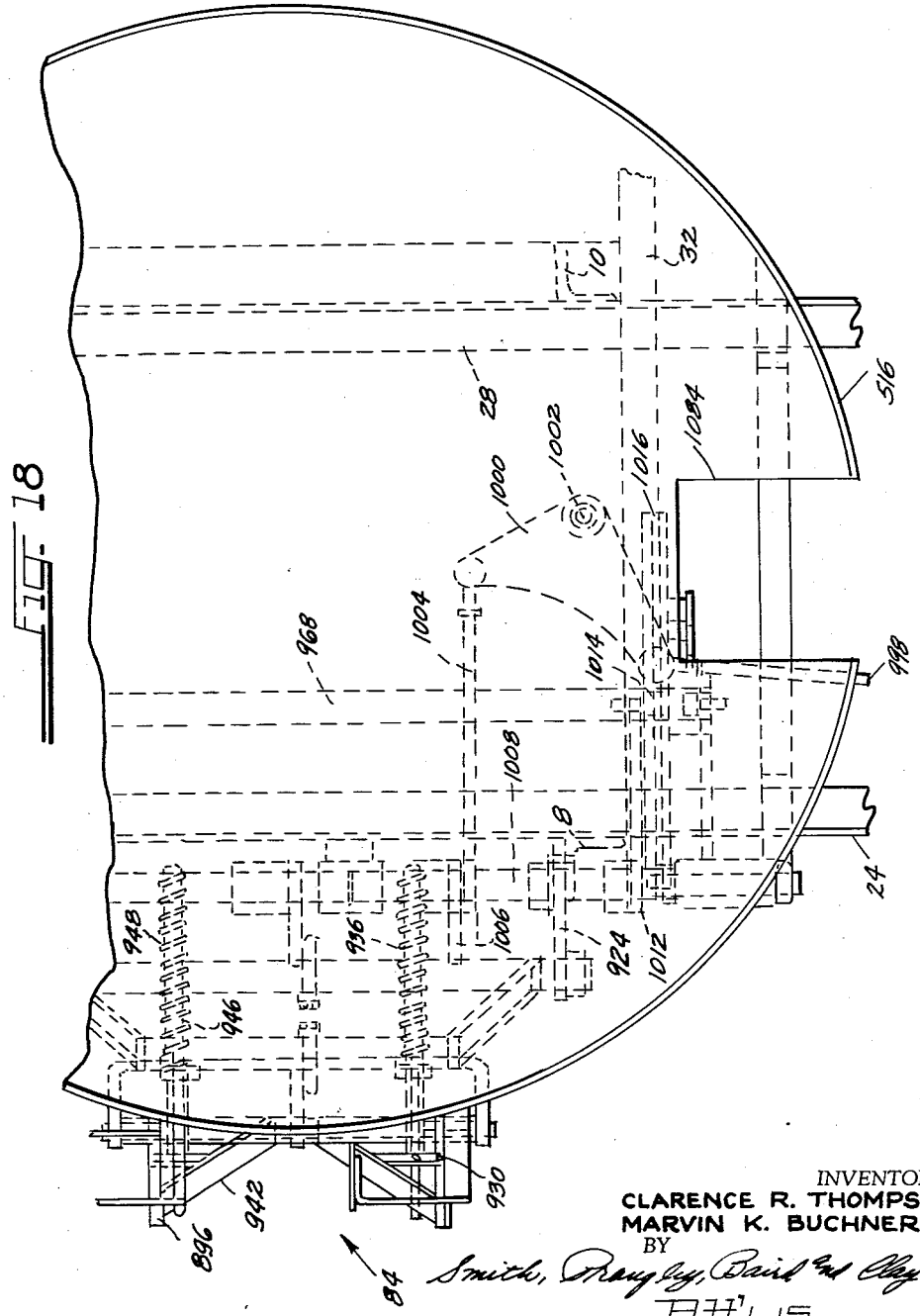

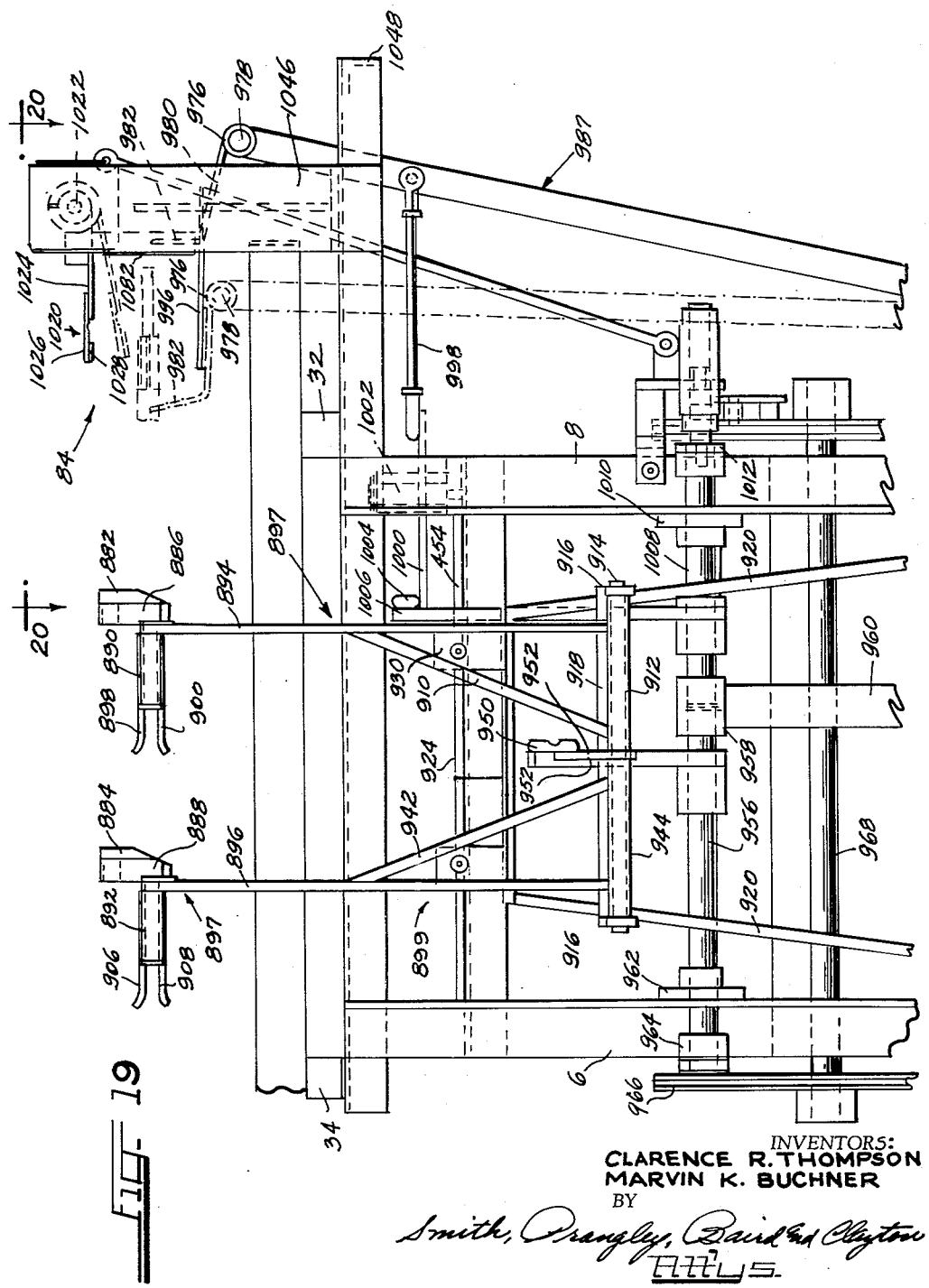

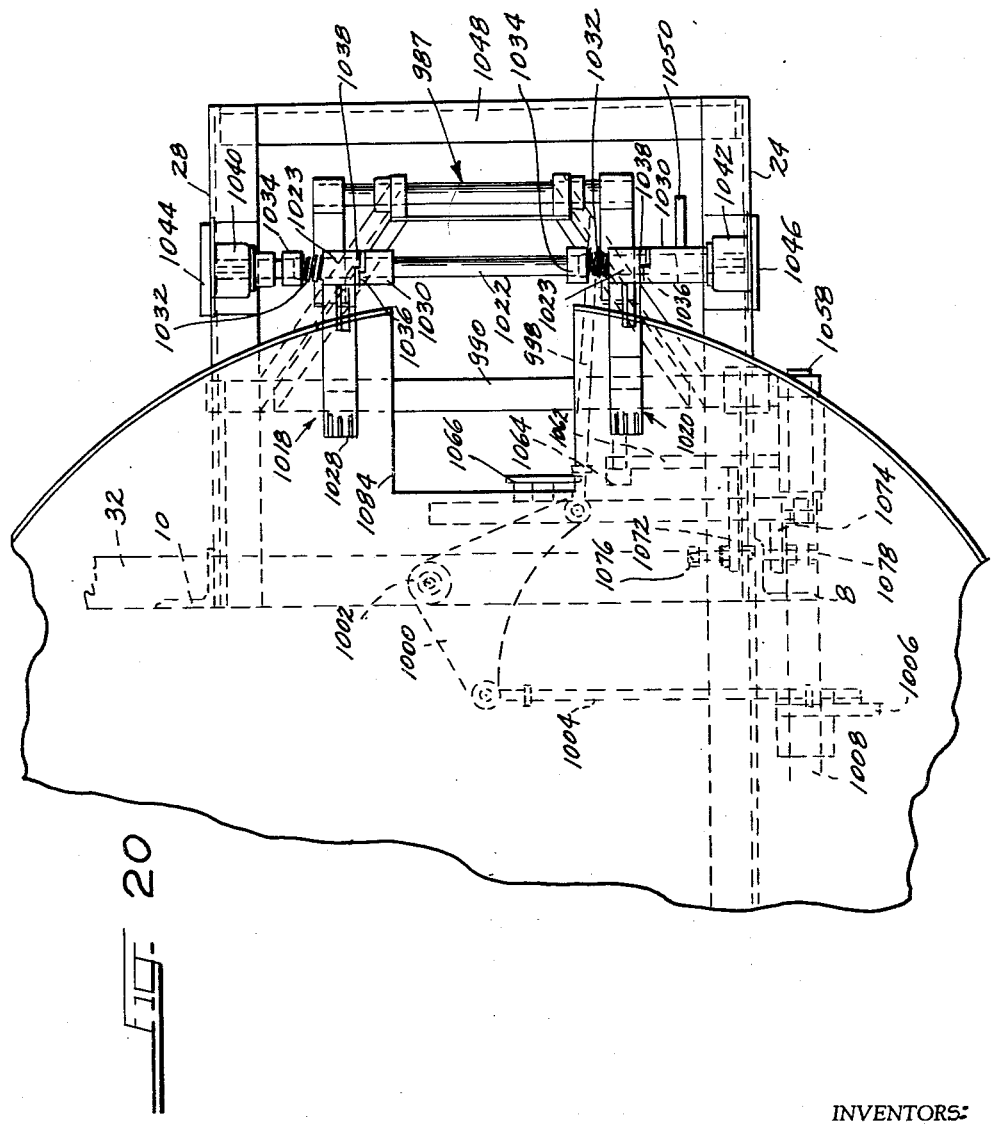

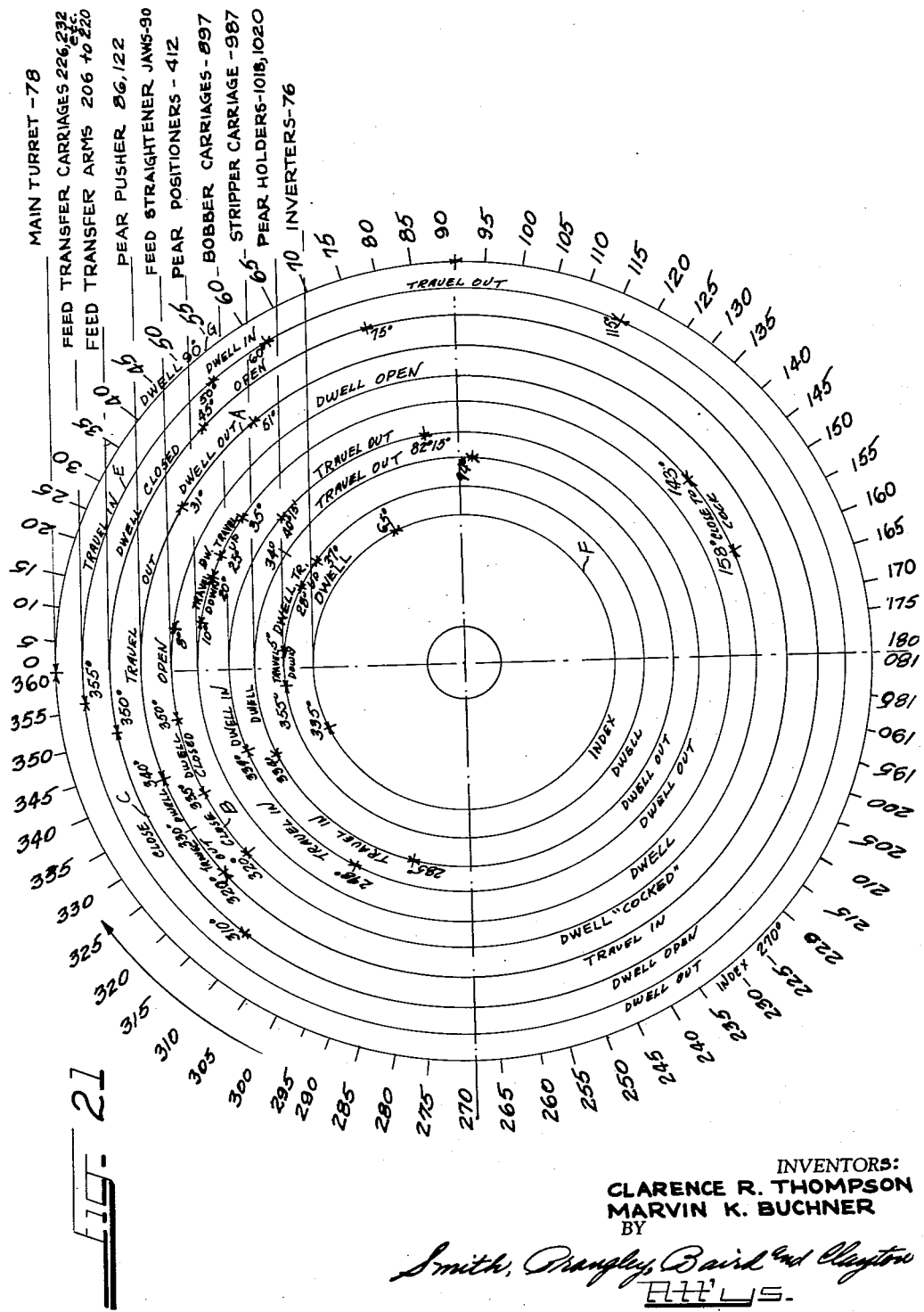

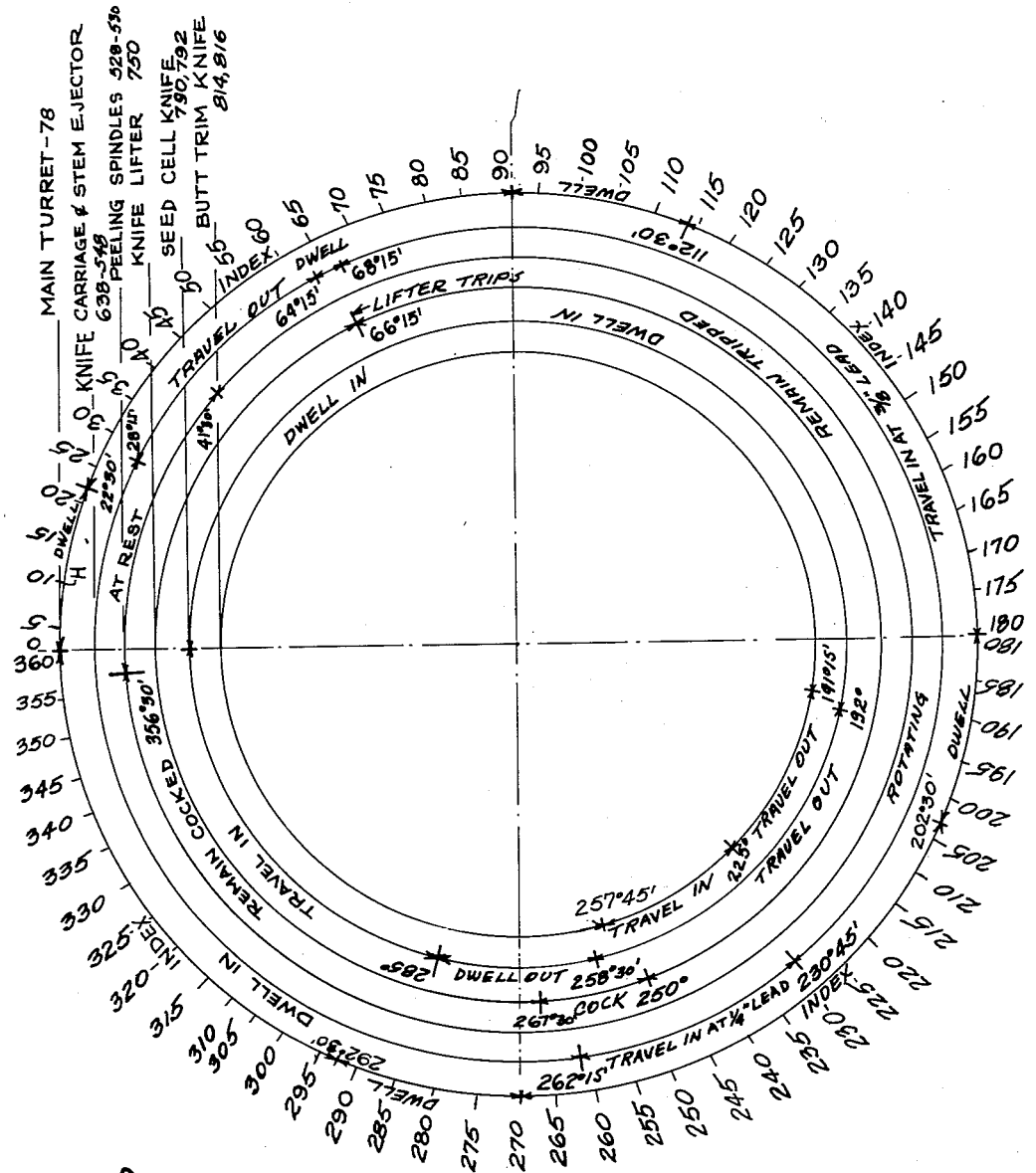

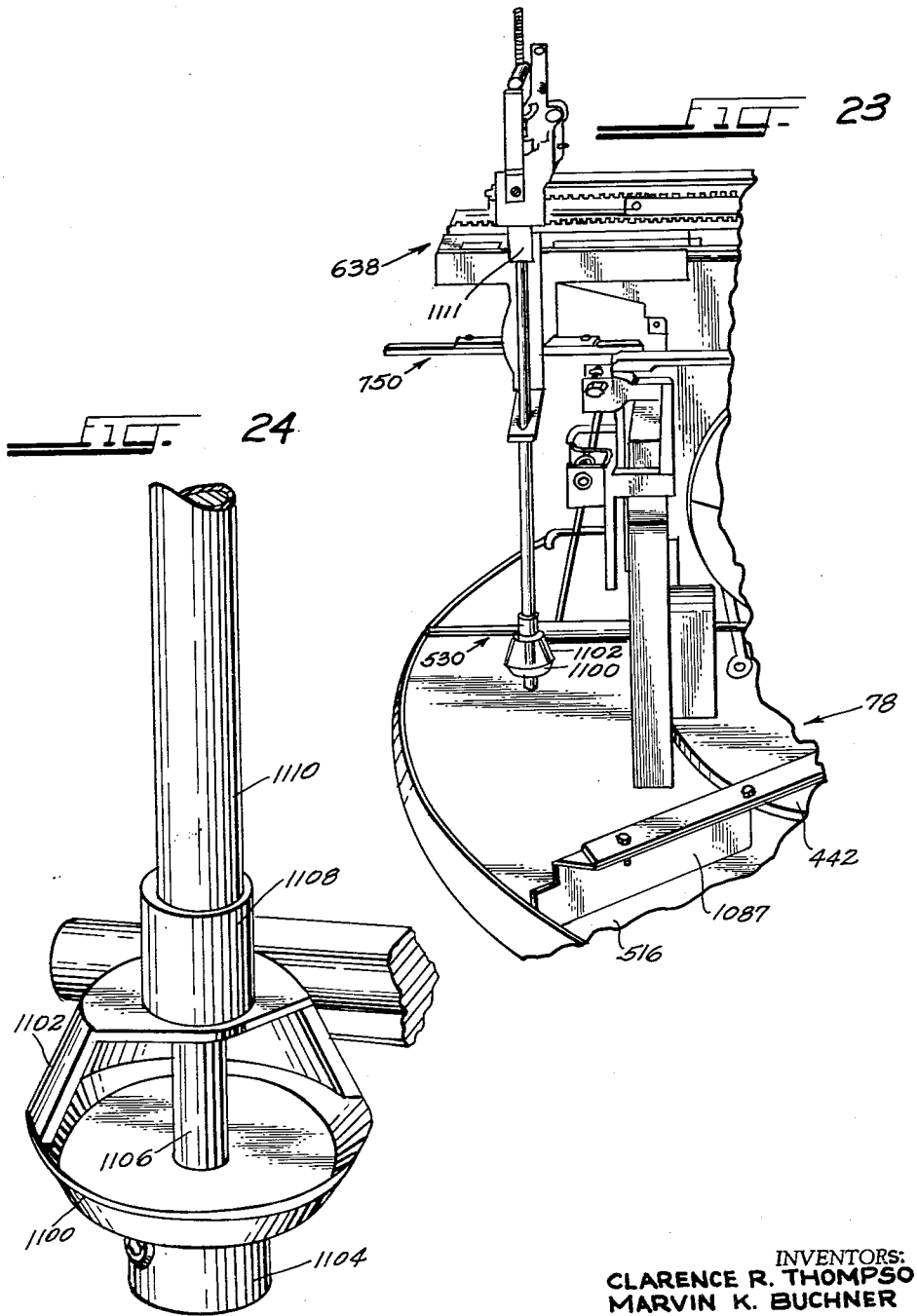

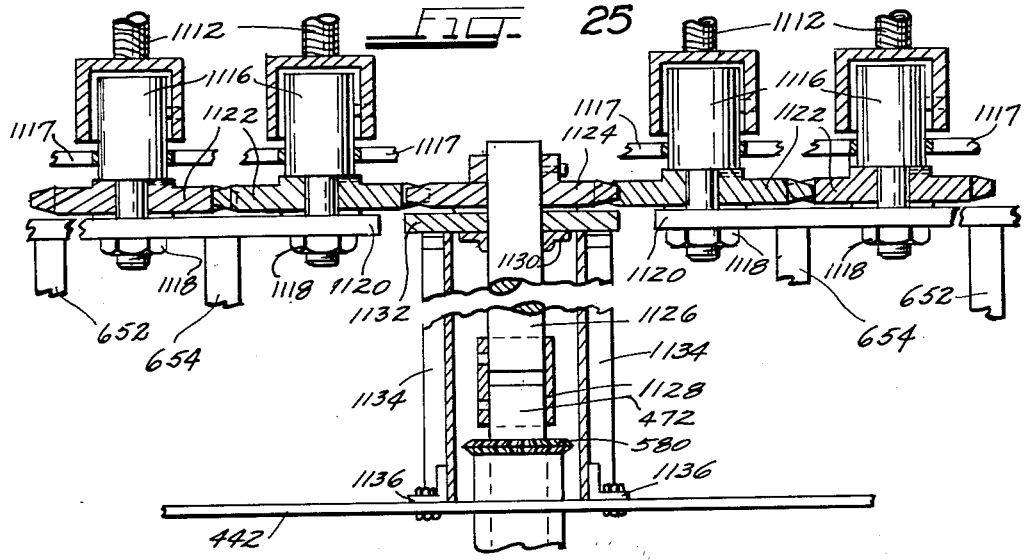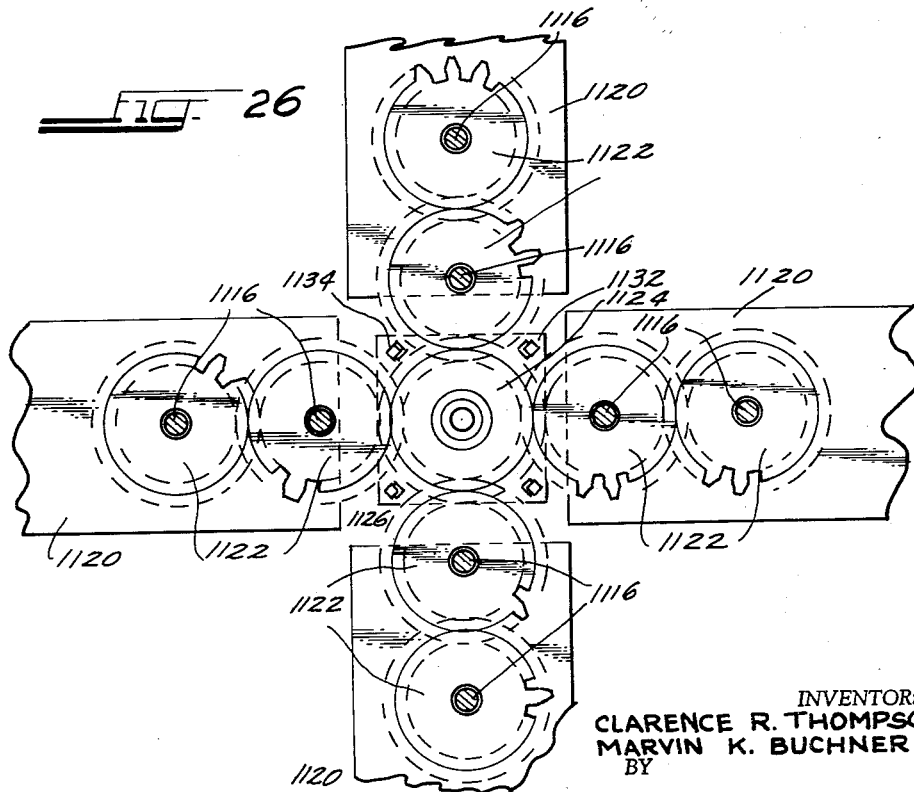

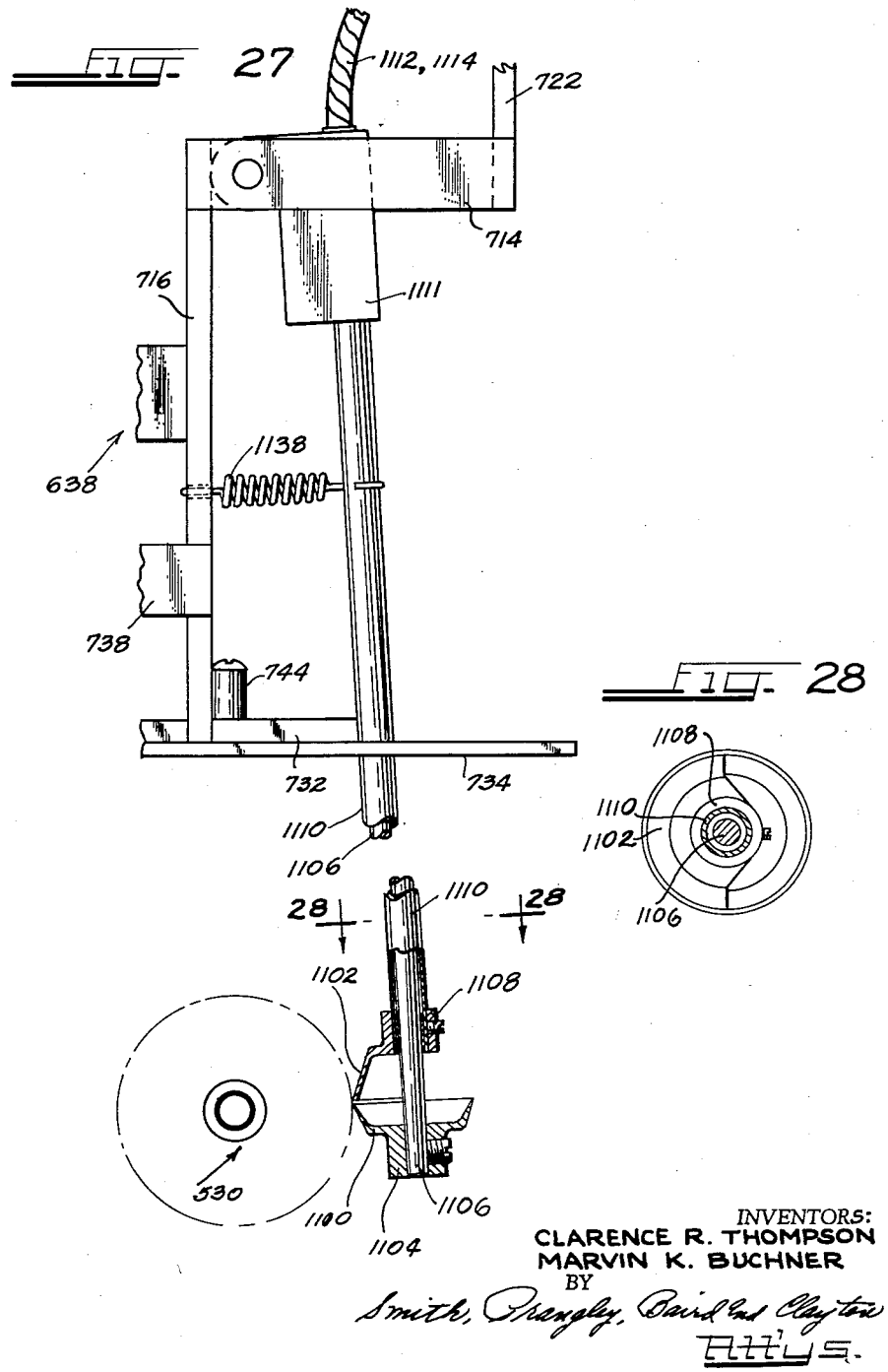

United States Patent Office 2,989,997
Patented June 27, 1961

2,989,997
PEAR ORIENTATING, FEEDING, PEELING, SEED CELLING, BUTT TRIMMING, BOBBING, AND SPLITTING MACHINE

Marvin K. Buchner and Clarence R. Thompson, Olympia, Wash., assignors, by mesne assignments, to Food Machinery and Chemical Corporation, San Jose, Calif., a corporation of Delaware
Filed Oct. 23, 1957, Ser. No. 691,818
24 Claims. (Cl. 146—33)

This invention relates to a pear preparation machine and more particularly to a machine for feeding, coring, peeling, bobbing and seed celling pears.

As the demands of the fruit canning industries have varied with economic forces and trends insufficiencies in the known fruit preparation machines to meet those demands have been encountered. Any pear preparation machine to be satisfactory must meet certain basic requirements in respect to (1) the cost of manufacture and expense of maintenance, (2) the quality of the prepared fruit produced by the machine, (3) the rate of production of fruit prepared by the machine, (4) the ratio of the tonnage output of the machine to the tonnage input to the machine, and (5) the simplicity of motions required of the operator in inserting the fruit into the machine.

Heretofore, the demands of the fruit canning industries have been largely focused upon the quality of the fruit judged by the standards of appearance in respect to the uniformity of shape of the prepared fruit; the smoothness of the grooves and lines of cut made in the fruit; the symmetrical location of the coring grooves in the fruit, and the smoothness of the peeled surface of the fruit. These quality requirements have heretofore been met at some sacrifice in the ratio of tonnage output to tonnage input. The demands of the fruit canning industry in response to inflationary economic trends have progressively become more and more focused upon the other basic requirements, namely, the attaining of higher ratios of tonnage output to tonnage input and of greater rates of production without increasing the strain upon the human operators and while holding the machine cost and expense of maintenance as low as possible. Various forms and types of machines have been developed to meet one or more of these requirements of the fruit canning industry, but those machines have not been entirely satisfactory because of their inability to meet others of such requirements of that industry.

Efforts have been made to increase the rate of production per operator by providing in a single machine parallel multiple fruit preparing units and an equal number of spaced, parallel receiving units all fed by a single operator feeding the spaced receivers one by one. While these multiple unit machines thus possess some advantage over an equal multiple of single unit fruit preparation machines each having a multiplicity of serially presented fruit receivers fed by a single operator at a fixed station, they have not been entirely satisfactory because of the consequent increased complexity and greater maintenance difficulties and because of the greater strain put upon the operators by reason of the complexity of movements required of the operator to successively feed the spaced, parallel receiver units, as where a single operator is required to feed from four to ten parallel receivers of such multiple unit machines. The use of plural operators each feeding a bank of the receivers of a multiple unit parallel receiver machine of course decreases the production rate per operator and frequently results in still higher labor costs than an equal multiple of single unit series receiver machines because any malfunctioning of a multiple unit machine in such circumstances not only results in a greater production loss during the longer "down time" of the more complex machine to effect the proper repairs or maintenance but also results in greater loss of labor costs due to the greater number of operators released from work during that "down time."

Efforts have been made to increase the rate of production by the development of "continuous" pear preparation machines, as distinguished from "intermittent" machines in which the rate of production is largely determined by the time required to perform peeling operations during the rest periods of the machine, but such continuous machines have not been entirely satisfactory because of their increased complexity; their higher cost of manufacture; their higher maintenance expense, and the various added strains placed upon the operators by reason of their more exacting and hazardous manual feed requirements.

Efforts have been made to increase the ratio of the tonnage output to the tonnage input by the development of various forms of contour responsive pear peelers removing thin peelings but machines using such peelers have not been entirely satisfactory because of the much greater time required to perform the peeling operation as compared with the well known pear-shaping peelers and because of the inability of the contour responsive peelers to produce pears of competitive appearance-quality with the pear-shaping peelers. Increases in the speed of operation of the contour responsive peelers to reduce the time required for performing the peeling operation have been accomplished but with the disadvantage of a decrease in the appearance-quality of the peeled fruit and an increase in machine "break-downs."

It is accordingly an object of this invention to devise a pear preparation machine which, as compared with known machines, may provide a higher ratio of tonnage output from the machine to tonnage input to the machine and a greater rate of production without placing a substantial additional strain upon the human operator and without substantially increasing the cost of manufacture and expense of maintenance of the machine and yet provide prepared fruit of desired quality.

More specific objects and advantages of the invention are to provide an intermittent pear machine of such structure and operation that the rate of production of peeled pears is substantially independent of the time required for peeling of the pears; to provide an intermittent pear machine capable of obtaining a high rate of production of prepared fruit while still capable of feeding by a human operator at a rhythmic rate and by a simple sequence of motions calculated to place a minimum strain upon the operator; to provide a pear machine the production rate of which is determined by the rate at which pears may be comfortably fed by the operator rather than by the time required for the various instrumentalities of the machine to perform the various fruit preparation steps; to provide an intermittent pear preparation machine in which pear preparation instrumentalities act upon the pear during both the stationary and moving periods of the fruit carrier whereby the rest intervals of the carrier can be governed by a comfortable rate of working of an operator rather than by the time intervals required by the fruit preparing instrumentalities to perform their functions on the fruit; to provide a dual pear preparation machine having dual pear receivers and feeders capable of receiving two pears at a time inserted by an operator by simple and rhythmic motions or movements without undue strain; to provide a dual pear preparation machine of the turret type embodying multiple peeling heads or units readily changeable to minimize the down time required for maintenance, to simplify and reduce the cost of manufacture of the machine and capable of operation by a single drive mechanism from which the units are readily disconnectable; to provide a new and improved pear orienting and feeding means; to provide new and improved pear coring, peeling, butt end trimming, stem end bobbing, seed celling and fruit discharging or ejecting mechanisms, operating individually, conjointly and conjunctively in a machine capable of providing an acceptable quality of fruit product at a high ratio of tonnage output to tonnage input, at a high rate of production, at a favorable investment in machine cost of manufacture, and at a relatively low machine maintenance cost while yet capable of feeding by a human operator by a simplicity of motions comfortably performed at a rhythmic rate at a single feed station.

Other and further objects and advantages of the invention will be apparent from the following description when taken in conjunction with the accompanying drawings wherein:

FIGURE 3 is a fragmentary view in front elevation taken substantially on the line 3—3 of FIGURE 2;

FIGURE 4 is a fragmentary plan view, with certain parts omitted, taken substantially on the line 4—4 of FIGURE 2;

FIGURE 5 is an enlarged fragmentary top plan view of the machine of FIGURE 1;

FIGURE 5A is a fragmentary view in vertical section taken along the line 5A—5A of FIGURE 5B;

FIGURE 5B is an enlarged fragmentary view in elevation of a pear feed straightening mechanism forming part of the machine;

FIGURE 6 is a fragmentary view in front elevation taken generally along the line 6—6 of FIGURE 4;

FIGURE 7 is a fragmentary view in side elevation looking generally along the line 7—7 of FIGURE 6;

FIGURE 8 is a fragmentary view in elevation taken along the line 8—8 of FIGURE 7;

FIGURE 9 is a fragmentary view in elevation and partly in section taken generally along the line 9—9 of FIGURE 4;

FIGURE 10 is a fragmetary plan view looking generally along the line 10—10 of FIGURE 9;

FIGURE 11 is a fragmentary view in elevation looking generally along the line 11—11 of FIGURE 9;

FIGURE 12 is a fragmentary view in horizontal section taken generally along the line 12—12 of FIGURE 9;

FIGURE 13 is an enlarged fragmentary view in side elevation of a peeling head unit forming part of the machine of FIGURE 1;

FIGURE 14 is a front view in elevation of the peeling unit of FIGURE 13;

FIGURE 14A is a plan view in perspective of the peeling head unit;

FIGURE 15 is a view in horizontal section taken generally along the line 15—15 of FIGURE 13;

FIGURE 16 is a fragmentary view in horizontal section taken generally along the line 16—16 of FIGURE 14;

FIGURE 17 is an enlarged fragmentary view in vertical elevation of the rear portion of the machine of FIGURE 1;

FIGURE 18 is a fragmentary top plan view looking generally along the line 18—18 of FIGURE 17 but with certain parts being omitted for purposes of illustration;

FIGURE 19 is a fragmentary view in elevation looking generally along the lines 19—19 of FIGURE 17;

FIGURE 20 is a fragmentary plan view looking generally along the lines 20—20 of FIGURE 19;

FIGURES 21 and 22 are timing diagrams explanatory of the operations of the machine;

FIGURE 23 is a fragmentary vertical view in perspective illustrating the machine equipped with a modified peeling head unit;

FIGURE 24 is an enlarged fragmentary view of a "live" peeling knife embodied in the peeling head unit of FIGURE 23;

FIGURE 25 is an enlarged fragmentary view in vertical section through the main turret illustrating a preferred form of drive mechanism for the peeling knives where the machine is equipped with peeling head units of the type shown in FIGURE 23;

FIGURE 26 is a plan view of the drive mechanism of FIGURE 25;

FIGURE 27 is an enlarged fragmentary view in elevation and partly in section illustrating the mounting of each "live" peeling knife, and FIGURE 28 is an enlarged view in horizontal section taken along the line 28—28 of FIGURE 27.

Figure 1:
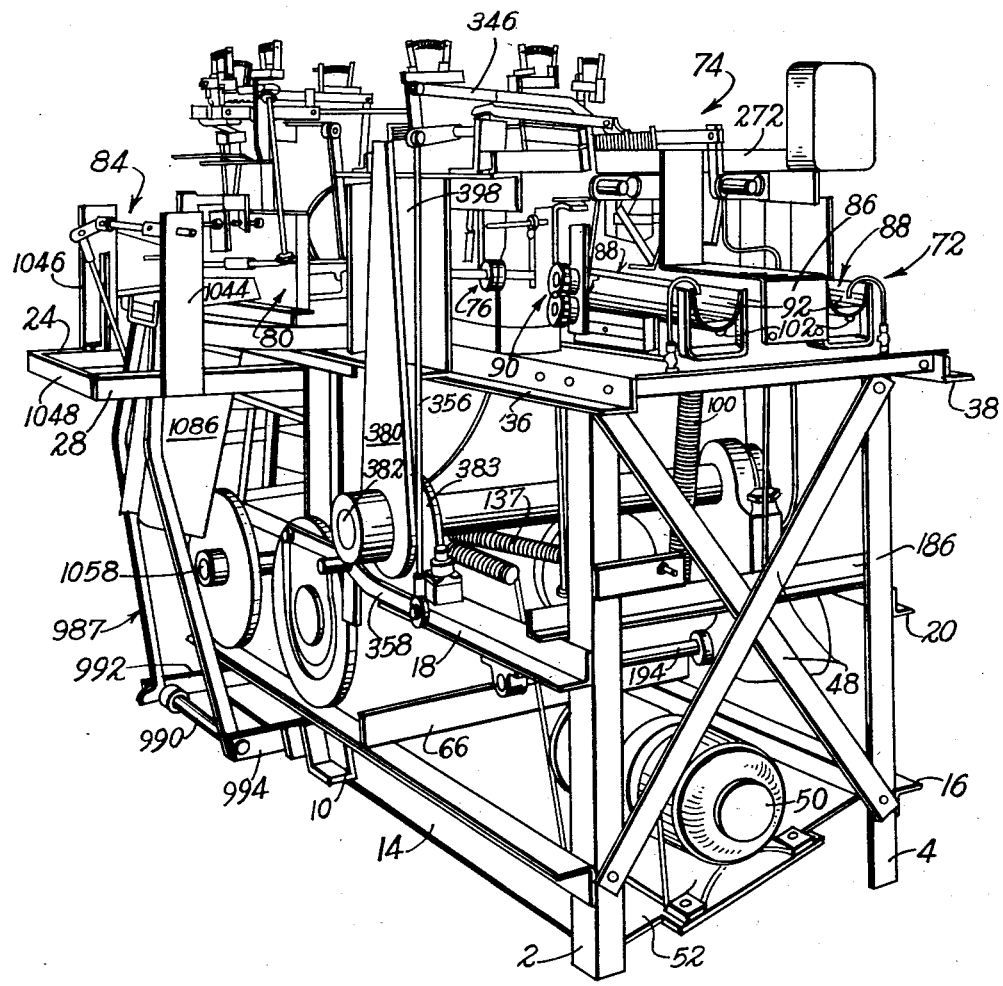
FIGURE 1 is a view in perspective of a machine embodying the present invention.
Figure 2:
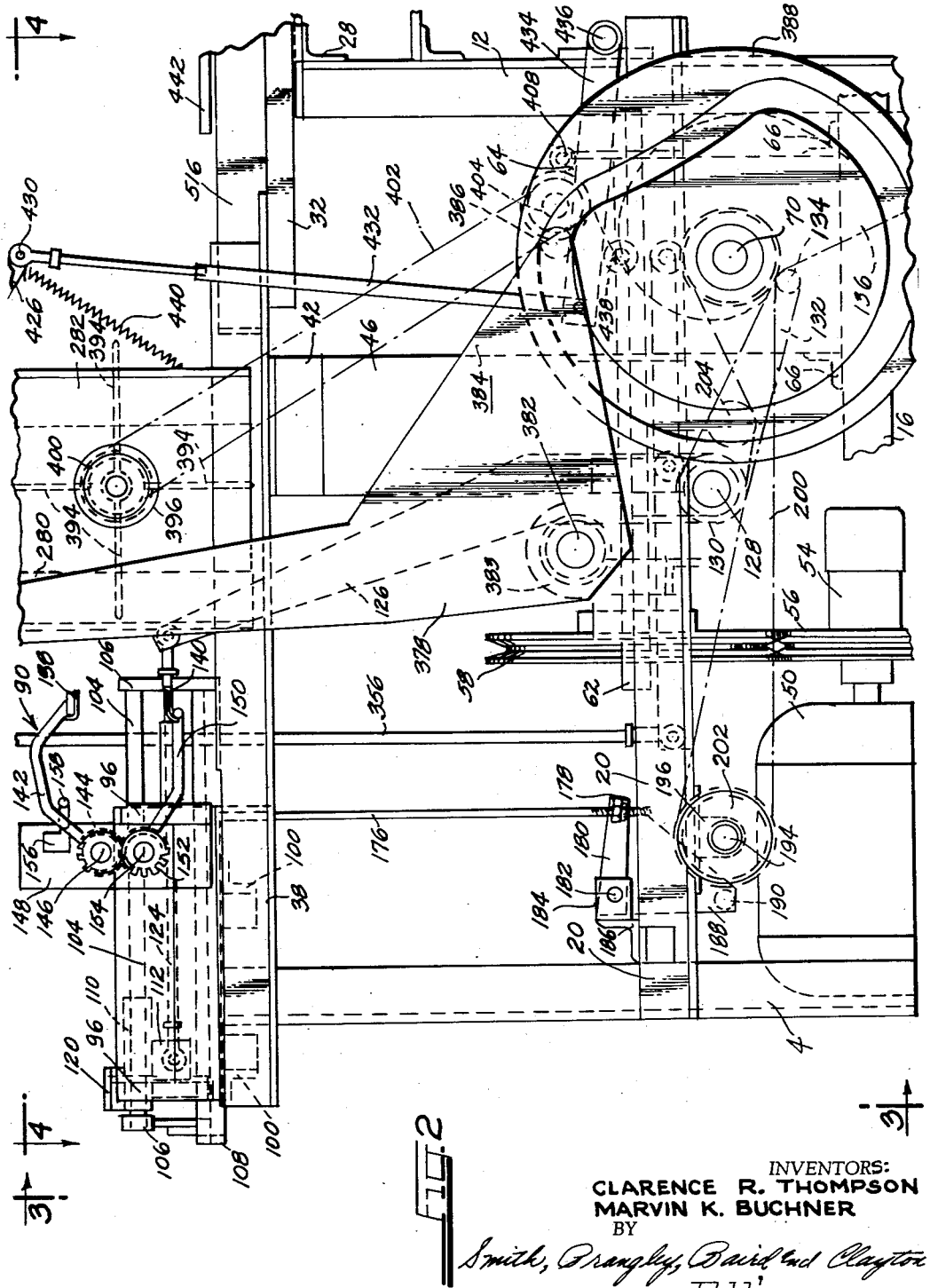
FIGURE 2 is an enlarged fragmentary view inside elevation of the machine of FIGURE 1.

A preferred embodiment of the machine as disclosed in the drawings comprises a machine frame having angle iron corner posts 2, 4, 6 and 8, FIGURES 1, 2, 3, 4, 9, 10, 11, 12, 17, 18, 19 and 20; intermediate vertical posts 10 and 12, FIGURES 1, 2, 9, 10, 12, 17, 18 and 20, lower side bars 14, 16, FIGURE 1, intermediate side bars 18 and 20, FIGURES 1, 2, and 9 secured to the front posts 2 and 4 and to a cross bar 22, FIGURE 9, secured to the intermediate posts 10 and 12. The rear posts 6 and 8 are joined by upper and lower cross bars 24 and 26, FIGURE 11, and the intermediate vertical posts 10 and 12 are joined by the upper and lower cross bars 28 and 30, FIGURE 9. Longitudinal bars 32 and 34, FIGURES 2, 9 and 11, extend between the upper cross bars 24 and 28 and extend forwardly beyond the cross bar 24 and are welded to the rear ends of side bars 36 and 38, FIGURES 1, 2 and 4, secured to the front upright posts 2 and 4 and to angle iron brackets 40 and 42. These brackets are also fastened to vertical supporting plates 44 and 46 extending between the side bars 18 and 36 and the side bars 20 and 38. Cross straps 48 interconnect the front corner posts adjacent to their upper and lower ends.

A drive motor 50 (FIGURE 1) is mounted upon a plate 52 secured in any convenient manner (not shown) to the lower side bars 14 and 16. A variable speed pulley unit 54 (FIGURE 2) is mounted upon the shaft of the motor 50, the pulley 56 driving a pulley 58 through a V-belt 60 diagrammatically illustrated in FIGURE 3.

The pulley 58 is secured to the end of shaft 62 (FIGURE 2) of a speed reducer unit 64, FIGURES 2, 4, 9, 10 and 12, mounted in any convenient manner on cross bars 66 supported on lower side bars 14 and 16. The speed reducer 64 is provided with an output shaft 68 (FIGURES 9 and 12) forming the main drive shaft and an output shaft 70 (FIGURES 2, 4, 9, 10 and 12) forming a main cam shaft and an auxiliary drive shaft.

The shaft 70 actuates and controls dual pear feeders and aligners 72 (FIGURE 1), dual sets of transfer mechanisms 74 and dual pear inverters 76 and the shaft 68 actuates and controls a pear feeding turret or conveyor 78, a multiplicity of dual pear peeling and coring heads or units 80 carried by the turret 78, dual pear bobbing mechanisms 82 (FIGURE 17) and dual pear clamping and discharging mechanisms 84 (FIGURES 17, 18 and 19) cooperating with the pear peeling and coring units to seed cell the pears and thereafter discharge the peeled, cored and deseeded pears from the peeling and coring units.

An operator stands in front of the machine as shown in FIGURE 1 and simultaneously or substantially simultaneously inserts or drops two pears into the pear feeders and aligners 72 by which the pears are fed into the machine and oriented with their stem axes extending horizontally and with their stem ends foremost. From the aligners, the pears are transferred by certain of the transfer mechanisms 74 to the pear inverters 76 which turn the pears to positions butt ends foremost. The pears are then carried from the inverter mechanisms by other elements of the transfer mechanisms 74 to the pear peeling and coring units 80 which at that time are positioned in alignment with the transfer mechanisms. The turret 78 upon which the peeling and coring units are mounted then carries the cored pears through a circular path, the pears being peeled as the turret is moving as well as while it is stationary, the turret through two successive movements carrying the pears to the bobbing mechanisms 82 and then to the pear clamping and discharging mechanism 84.

The pear feeders and aligners

The pear feeders and aligners 72, as best shown, in FIGURES 1 to 4, 5A and 5B, comprise an intermittently actuated pear pusher 86, dual pear feed chutes 88; dual pear turning and stem aligning or straightening mechanisms 90, and certain drive connections therefor.

The feed chutes 88 comprise generally semi-cylindrical, stainless steel, sheet metal troughs 92 having outwardly turned edge flanges 94, Figures 3, 4, 5A and 5B, overlying the outwardly turned flanges of generally U-shaped brackets 96 bolted or otherwise fastened to mounting plates 98 in turn secured to cross bars 100 secured to the frame bars 36 and 38.

Each trough 92 is preferably provided with a central depression 102 which receives the stems of the pears as the downwardly converging side walls of the trough automatically align the stem-blossom axis of the moving pear lengthwise of the trough with its stem end down. The depression 102 by receiving the pear stems assists in keeping the pears in alignment as they are moved along the trough. At its forward or delivery end, each trough is very shallow, its side walls being reduced or cut away, except for a relatively small portion by which the pear is supported.

The pear pusher 86 comprises a fixed guide rod 104 mounted at its ends in brackets 106 mounted upon an elongated guide block 108 fixed to the cross bars 100. A tube 110 is slidably mounted upon the guide rod 104 and formed with a depending plate like portion 112 from which further depends a guide lug 114 received in a slot 116 in the guide block 108. The tube 110 is also formed with an upwardly extending lug 118 on which is bolted a cross bar 120 which extends over both feed troughs 92 and carries at its opposite ends pusher plates 122 each symmetrically arranged with respect to a vertical plane through the geometric axis of the trough.

The pusher plates 122 are reciprocated along the trough by means of a link 124 pivotally connected at its forward end to the depending flange 112 of the sleeve 110 and at its other end to a pear pusher arm 126 secured to a shaft 128 journalled in suitable brackets, as 130, mounted upon side bars 18 and 20. A pear pusher lever 132 is secured to the shaft 128 and carries a pear pusher cam roller 134 actuated by a pear pusher cam 136 secured to the main cam shaft 70. A spring 137, FIG. 1, secured to a lever (not shown) fastened to the shaft 128 and to the hanger 129 maintains the roller 134 in engagement with the cam 136 and returns the pushers very quickly to the receiving ends of the troughs.

The dual pear turning and stem aligning or straightening mechanisms 90 comprise two pairs of pear straightening jaws 138 and 140, which may be formed of sheet metal and are preferably V-shaped in elevation, each lower jaw 140 being of a greater transverse width than an upper jaw 138. Each jaw 138 is secured to the outer free end of a rod 142, which is bent longitudinally and transversely of the trough axis and at its opposite end welded to the hub of a pinion gear 144 journalled on a stud bolt 146 threaded into a mounting bar 148. Each lower jaw 140 is secured to the outer end of a rod 150 having a portion extending transversely of the trough axis and a portion extending parallel to the trough axis, the inner end of the rod being secured to the hub of a pinion gear 152 meshing with the pinion gear 144 and journalled on a stud bolt 154 also threaded into bar 148.

A bracket 156 attached to each mounting bar 148 carries at its outer end a lug 158 extending into the path of the rod 142 to serve as a stop preventing the jaws 138 and 140 of each pair from striking each other when no pear is delivered to the discharge end of a trough by a pusher plate.

Each rod 150 has welded to it an upwardly extending lug 160 and a downwardly extending lug 162, lug 160 carrying a stud bolt 164 which is slidably received in a slot 166 of a link or bar 168. The bar 168 is bent outwardly at its upper end and overhangs the lug 160 and forms a support for a pin 170 to which is secured the upper end of a spring 172 secured at its other end to a pin 174 carried by the lug 162. It will be seen that on downward movement of the bar 168 the rod 150 will be moved downwardly by reason of the engagement of the upper end wall of slot 166 with the bolt 164 and hence the jaws 138 and 140 will be moved to open position. As the bar 168 moves upwardly it tends to extend the spring 172 and that spring, therefore, moves the lower jaw 140 upwardly. The extent of upward movement of the jaw 140 and the related downward movement of the jaw 138, need not, however, be the same as the upward movement of the bar 168, for if the jaws are limited in their movement by the presence of a pear between them, the bar 168 may continue to move upwardly relatively to the rod 150 by virtue of the pin and slot connection between the lug 160 and the bar 168.

The actuator bars 168 for the straightening jaws are welded to actuator rods 176, FIGURES 2 and 3, which at their lower ends are received in apertured lugs 178 at the free ends of levers 180 fixed to a shaft 182. The shaft 182 is journalled in suitable brackets 184 fastened to an angle bar 186 extending between and supported by the side bars 18 and 20. A crank 188, secured to the shaft 182 substantially centrally thereof, carries a cam roller 190 actuated by cam 192 secured to a cam shaft 194. The cam shaft 194 is mounted in suitable bearing blocks 196 secured to the side bars 18 and 20. Cam shaft 194 is driven by a sprocket 198 (FIG. 4), secured to the main cam shaft 70, through a chain 200 passing about the sprocket 198, about a sprocket 202, secured to the shaft 194, and under an adjustable tightener sprocket 204 (FIG. 2), mounted in the usual manner (not shown) upon the side bar 20.

Transfer mechanisms and pear inverters

The transfer mechanisms 74 comprise, as best shown in FIGURES 1 and 5 to 8, dual sets of butt engaging transfer jaws 206, 208, 210 and 212. The jaws 206 and 208 are fashioned as shown in FIGS. 6 and 7 to encompass and grip the butt ends of the pears when the jaws are closed and the jaws 210 and 212 are fashioned as shown in FIGS. 7 and 8 to encircle and grip the pears adjacent their butt ends.

The transfer mechanisms also comprise sets of neck-engaging transfer jaws 214, 216, 218 and 220. The transfer jaws 214 to 220 are of generally shallow V-shape in form as exemplified in FIGS. 6 to 8 to encompass and grip the neck ends of the pears when the jaws are in closed position.

The transfer jaws 206 are secured to levers 222 formed integrally with hub portions 224 journalled on a slide rod 226. Each jaw 208 is secured to a lever 228 formed integrally with a hub portion 230 journalled on a slide rod 232.

The jaws 214 and 216 are secured to levers 234 and 236, respectively, having hub portions 238 and 240, respectively, also journalled on slide rods 226 and 232. The jaws 206 and 208 are interconnected for equal simultaneous movement by gear sectors 242 and 244, respectively, formed integrally with hub portions 224 and 230 and the neck jaws 214 and 216 are interconnected for simultaneous equal movement by similar gear sectors formed integrally with the hub portions 238 and 240. The lever arms 234 carrying the jaws 214 are formed with rearwardly extending lugs 250 carrying adjusting screws 252 adapted to contact lugs 254 depending from the hubs 224 so that upon opening of the jaws 206 the jaws 214 will be moved to open position.

Each pair of jaws 214—216 is moved to closed position under the action of a spring 256 secured at its opposite ends to pins 258 and 260 carried by the jaw levers 234 and 236, respectively. One-piece journal bushings (not shown) for the hub portions of the jaws 206—214 and 208—216 project beyond those hub portions and through end plates 264 and 266 which are secured in any convenient manner to those journal bushings and the slide rods to hold the jaws 206, 208, 214 and 216 in assembled relation and cause reciprocation of the slide rods and the jaws as a unit.

The slide rods 226 and 232 are slidably mounted in guide blocks 268 and 270 secured to angle irons 272 and 274 supported by longitudinal angle bars 276 and 278 in turn supported by upstanding angle bars 280, 282, 284 and 286 fastened to and upstanding from the side bars 36 and 38.

The butt-engaging jaws 210 and 212 are mounted on levers 288 and 290 journaled on the rods 226 and 232. The neck-engaging jaws 218 and 220 are mounted on levers 292 and 294, the levers 292 being journaled on the rods 232 and the levers 294 being keyed to the rods 226. The levers 292 and 294 are interconnected for simultaneous opening and closing movement by gear sectors 296 and 298 formed integrally with the hub portions of these levers. The lever arms 288 and 290 carrying the jaws 210 and 212 are formed with lateral lugs carrying adjusting screws 300 and 302 adapted to contact the lever arms 292 and 294 and thus provide lost-motion connections between the jaws 210—212 and the jaws 218—220 whereby to cause the jaws 210 and 212 to move to open position upon the opening of the jaws 218 and 220. A jaw-closing coil spring 304 is secured at opposite ends to pins 306 carried by the jaw levers 288 and 290.

The jaws 206, 208, 214 and 216 are positively moved to open positions, and their movements to closed positions controlled, by actuator bars 308 and 310, FIGURES 5 to 7, each secured to mounting levers 312 and 314 journaled on the slide rod 226 but fixed against endwise movement with the slide rods. The actuator bars 308 and 310 bear against slide shoes 316 and 318 fastened to rods 320 which are slidably mounted in upstanding arms of brackets 322 secured to lever arms 324 formed integrally with the hub portions 224 of the levers 222. Rollers 326 on the free ends of lever arms 324 bear against the opposite sides of the actuator bars 308 and 310. Coil springs 328 are interposed between the shoes 316—318 and the brackets 322 and form yieldable driving connections between the actuator bars and the jaws so that the actuator bars not only control the closing of the jaws 206, 208, 214, and 216 under the action of the springs 256 when the bars are moved in counterclockwise directions as seen in FIGURE 6 but also provide fruit-gripping pressures to the butt-engaging jaws 206 and 208 under all circumstances. Should any pair of the jaws 206, 208, 214 and 216 tend to stick in open or partially open positions the pressures built up in the springs 328 will quickly overcome that tendency.

The slide rods 226 are oscillated about their own axes, to effect the opening, and to control the closing, of the jaws 210, 212, 218, and 220, by the actuator bars 308 and 310 acting through the slide shoes 316 and 318 which for that purpose are provided with rods 330 slidably mounted in the upstanding arms of brackets 332 similar to the brackets 322. The brackets 332 are formed as parts of levers 334 keyed to the slide rods 226 and carrying on their upper ends rollers 336 which engage the actuator bars 308 and 310.

Coil springs 338 mounted upon the rods 330 and interposed between the shoes 316, 318 and the brackets 332 form yieldable driving connections between the actuator bars and the slide rods 226.

The actuator bars 308 and 310 are interconnected for simultaneous swinging movement, or oscillation, by a link bar 340 pivoted at its opposite ends to lateral ears of upstanding lugs 342 and 344 formed on actuator bars 308 and 310, respectively, and the bar 308 is actuated through a lever 346 pivoted at one end to the lateral ear of the lug 342 and its other end to a crank 348 welded to a shaft 350 journaled in the upstanding arms of angle brackets 352 fastened to the angle bar 278. The shaft 350 is oscillated through a crank 354 welded to the shaft 350. A link 356 is pivoted at one end to the crank 354 and its other end to a lever 358 pivoted intermediately its ends on a bracket (not shown) fastened to the frame bar 18 and carrying at its other end a cam roller (not shown) riding in the cam track of a cam disk 360, FIGURES 1 and 4, secured to the main cam shaft 70.

The slide rods 226 and 232 form part of a slide carriage comprising an angle bar 362, FIGURES 5 to 7, a plate or bar 364 and interconnecting straps 366 fastened to the angle bar 362 and the plate 364, the bar 362 and the plate 364 being mounted on the slide rods by means of apertured blocks such as 367 and 368, FIGURE 7, welded or otherwise fastened to the bar 362 and the plate 364 and secured to the slide rods in any convenient or conventional manner (not shown) so as to cause movement of the rods with the carriage while permitting the rods 226 to oscillate relative to the carriage.

Brackets 370 and 372, FIGURE 5, are welded to the angle bar 362 at its opposite ends and adjustable actuating links 374 and 376 are pivotally secured to the side flanges of the brackets 370 and 372 and to actuating levers 378 and 380, FIGURE 6. The levers 378 and 380 are keyed to a cross shaft 382, FIGURES 1 to 4, mounted in bearing blocks 383 which are supported by frame bars 18 and 20. Lever 378 is formed as part of a bell-crank having a lever arm 384, FIGURE 2, carrying at its outer end a cam roller 386 riding in the cam track of the cam disk 388 secured to the main cam shaft 70.

Each of the pear inverters 76, of which there are two, comprises a collar 390 pinned to a cross shaft 392 and provided with four pear receiving and inverting spikes 394 extending radially of the collar and perpendicular to each other, the spikes being preferably sharpened on the ends for easy penetration of the pears. The shaft 392 is journalled in bearing blocks 396 fastened to mounting plates 398 welded to the upright angle bars 280, 282, 284 and 286. The shaft 392 carries, adjacent one end, a sprocket 400 driven by a chain 402 passing about the sprocket 400 and a drive sprocket 404, driven by a Geneva wheel 406 of a Geneva motion mechanism. The crank 408 of the Geneva motion mechanism is driven by a gear 410 in mesh with a gear 412 secured to the main cam shaft 70.

The Geneva motion mechanism causes the inverters 76 to move intermittently through angles of 90°. During the rest periods of the inverters pairs of opposite spikes 394 are positioned in horizontal planes and other pairs of opposite spikes are positioned in vertical planes.

Dual butt-engaging means 413, FIGURE 7, are provided for successively positioning or re-positioning each pear, regardless of length, in a predetermined position on a spike with respect to the butt end of the pear. This means comprises dual pear engaging pads or rings 414, only one of which is shown in the drawing, FIGURES 7 and 8, secured to the depending ends of brackets 416 welded to a cross bar 418, in turn welded at its ends to parallel levers 420 and 422 upon coaxial pivot bolts 424, carried by the angle bars 276 and 288. The lever 422 is formed with an integral arm 426 which carries at its free end a stud 428 bored and drilled to receive a pivot bolt 430 for an adjustable actuating link 432, FIGURE 2. The link 432 is pivoted at its lower end to a lever 434 journaled on a stud 436 carried by a suitable bracket secured to the upright angle bar 12. The lever 434 is periodically raised, to depress the pear positioning pads 414, by a roller 438 mounted on a pin or pivot bolt secured to the inner face of the cam 388.

A spring 440 secured at one end to the lever arm 426 and at the other end to the upright angle bar 282 returns the pear positioning pads 414 to their open positions as it returns the lever 434 to its lower position, determined by any suitable stop (not shown).

The pear feeding turret or conveyor

The turret or conveyor 78, as best shown in FIGURES 1, 9 to 11 and 17 to 20, comprises a large disk 442, FIGURES 9 to 11, having a hub portion 444 keyed to a sleeve 446 journaled in bearings 448 and 450, bearing 448 being mounted on a plate 452 secured to the angle bars 24 and 28 and bearing 450 being fastened to a plate 454 secured to cross angle bars 456 and 458 fastened to the angle bars 10 and 12 and 6 and 8, respectively. The turret disk 442 is driven, through quarter revolutions, from the output shaft 68 of the speed reducer 64 through a shaft 460 mounted in bearing blocks 462 fastened to a supporting plate 464 mounted upon the cross bar 22 and a like cross bar 466 fastened to the rear uprights 6 and 8. A bevel gear 468 is secured to the inner end of the shaft 460 and meshes with a bevel gear 470 secured to a vertical drive shaft 472 mounted in suitable thrust bearings, as 474, and journaled in the sleeve 446 by bushings 476, 478 and 480. A pinion gear 482 secured to the vertical shaft 472 meshes with a pinion gear 484 secured to a vertical stud shaft 486 journaled in a bearing 488 carried by the plate 464 and a bearing 490 mounted on a plate 492 secured to brackets 494 fastened to the plate 464. A gear 496 secured to the stud shaft 486 meshes with a gear 498 affixed to a vertical shaft 500 journaled in bearings 502 and 504 carried by the plate 492 and plate 464. The shaft 500 has secured to its upper end a Geneva crank 506, the crank roller 508 of which engages with the driven Geneva wheel assembly 510, bolted to the flange 512 of a collar 514 keyed to the turret sleeve 446. The Geneva crank 506 and Geneva wheel assembly 510, formed as shown in dash lines in FIGURE 10, cause the turret disk 442 to rotate through a quarter revolution for each revolution of the Geneva crank shaft 500.

An annular sheet metal waste trough 516 is mounted on the bars 24, 28, 32, and 34 and extends inwardly below the edge of the turret disk 442.

The dual pear peeling and coring units

Four or more dual pear peeling and coring units 80 may be mounted upon the turret disk 442 in equiangular relation, the disk being provided with upstanding lugs 522, FIGURE 10, positioned 90° apart to insure the correct angular positioning of each of the dual pear peeling and coring units 80.

Each of the dual pear peeling and coring units 80, as best shown in FIGURES 1 and 13 to 15, comprises a support casting 524 having a slot or groove 526 in its base portion to receive one of the positioning lugs 522 upon the turret disk 442. Dual pear rotating and coring spindles 528 and 530 each comprises a pear coring tube 532 having at its free end a sharpened edge 534 formed by beveling the inner end surface of the tube and having adjacent its other end four pear penetrating fins 536 brazed to the tube or formed integrally with a flanged sleeve 538 splined to, or press-fitted into, a hollow spindle or shaft 540 journaled by bearings 542 in a hollow boss 544 formed in a lateral arm 546 of the main support casting 524. A stem and core ejecting rod 548 is provided for each of the pear rotating and coring spindles 528 and 530, the rod being slidably mounted in the hollow shaft 540, the sleeve 538, and the tube 532. A drive gear 550 is keyed to the hsaft 540 of the pear rotating and coring spindle 530 and a like gear 552 is similarly keyed to the shaft 540 of the pear rotating and coring spindle 528. The gears 550 and 552 are simultaneously and synchronously rotated by a common gear 554 meshed with the gears 550 and 552. The gear 554 is fastened by screws 556 to the flange of a drive sleeve 558. The sleeve 558 is journalled by a ball bearing 560 and a spacer sleeve or bushing 562 on a shaft 564. The shaft 564 is journalled by a bearing 566 in the rear wall 568 of the support casting 524 and also by a bearing 570 in a block 572 bolted to the forward wall portions 574 and 576 of the main support casting 524.

The shaft 564 is continuously rotated by a bevel gear 578 which meshes with a bevel gear 580, FIGURE 9, when the peeling and coring unit is mounted upon the turret disk 442. It may here be noted that the bevel gears 578 of all dual pear peeling and coring units engage the common bevel gear 580 secured to the upper end of the continuously driven shaft 472. The shaft 564 drives the sleeve 558 through a clutch consisting of a driving clutch plate 582 keyed to the shaft 564, a friction clutch plate 584 and a driven clutch plate 586. The driven clutch plate 586 is splined to the sleeve 558 as by one or more keys 588 secured by radially extending friction pins to the sleeve 558. A coil spring 590 encompasses the sleeve portion of the clutch plate 586 and is interposed between the flange of the clutch plate and a radial flange of the sleeve 558 so as to urge the slidable clutch plate into engagement with the friction plate 584 and the friction plate into engagement with the drive clutch plate 582. A flange of the clutch plate 586 is formed with an annular groove to receive actuating pins 592 and 594 carried by parallel levers 596 and 598 secured to a common shaft 600 journalled in bosses 602 formed in the main supporting casting 524. Lever 598 is provided with a lateral extending boss (not shown) on which there is mounted, as by pivot bolt 604, a cam roller 606. A cam segment 608 is fastened to a cam disk 610 and engages the cam roller 606 during a portion of each revolution of the disk 610 whereby to swing the parallel levers 596 and 598 in a counterclockwise direction, as seen in FIGURE 13, and disengage the clutch plate 586 from the drive clutch plate 582, thereby terminating rotation of the peeling and coring spindles 528 and 530.

The cam disk 610 is keyed to a shaft 612 mounted in bearings 614, FIGURE 16, carried by a boss 616 formed in the main support casting 524. Shaft 612 carries at its opposite end a worm wheel 618, on the hub of which is mounted a cam 620 fastened as by screws 622 to the worm wheel for rotation therewith. The worm wheel 618 is continuously driven by a worm 624, FIGURES 13A and 15, pinned to a shaft 626 journalled by suitable bushings in bearing bosses 628 formed in support casting 524. A pinion gear 630 is keyed to the shaft 626 and meshes with a gear 632 keyed to the continuously driven shaft 564.

Figure 13A:
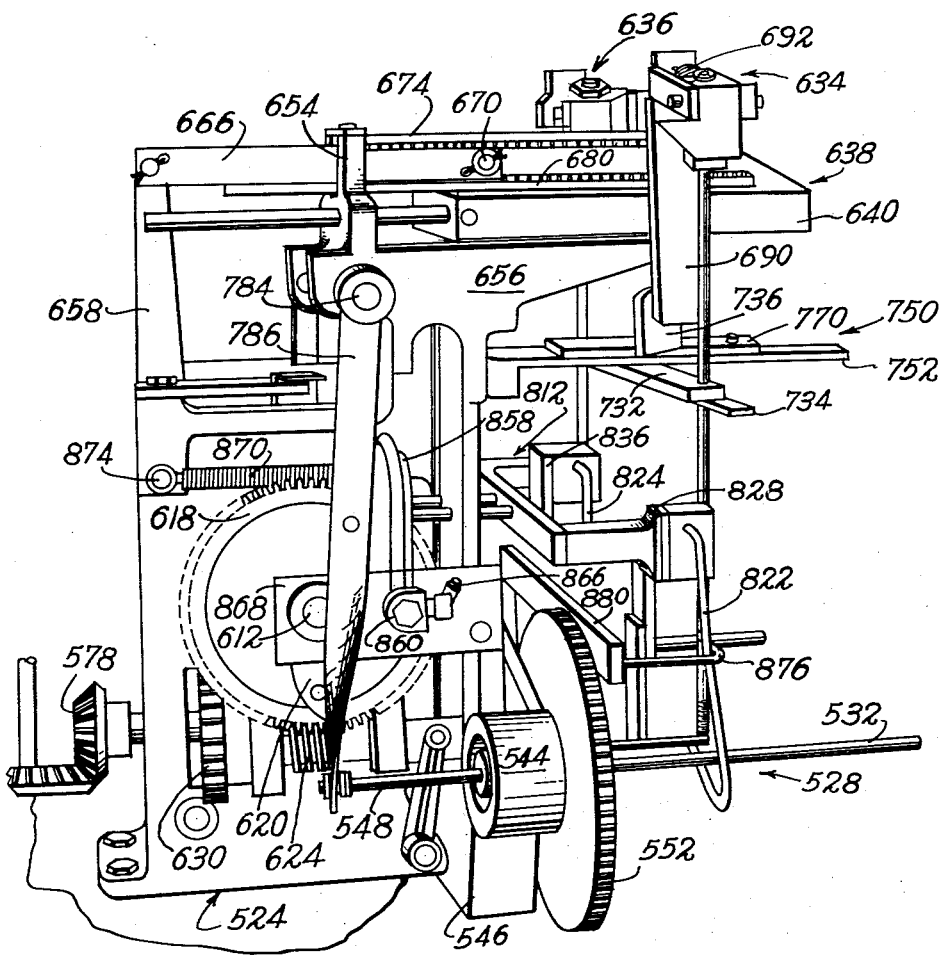
FIGURE 13A is a view in perspective of the opposite side of the peeling head unit.

Dual pear peeling knife assemblies 634 and 636, FIGURES 13A, 14 and 14A are mounted on the opposite sides of a main, slide-carriage 638. The slide carriage 638 comprises longitudinal bars 640 and 642 fastened to front and rear cross bars 644 and 646, the cross bars 644 and 646 being secured to slide rods 648 and 650, slidably mounted in guide blocks 652 and 654 formed on a supporting block 656 bolted to the top of the main support casting 524. The carriage 638 is advanced and retracted by the oscillation of an actuating lever 658 secured to a stud shaft 660 journalled in a boss provided by the main support casting 524. The lever 658 carries, intermediate its ends, a cam roller 662 engaging an internal cam track (not shown) of a disk cam 664 fastened to and rotated with the cam disk 610. The actuating lever 658 is pivoted at its upper end to spaced parallel bars 666 and 668 carrying at their forward ends a pin or shaft 670 on which is journalled, between the bars, a small pinion gear 672. The pinion gear 672 engages a fixed rack 674 mounted between the upstanding arms of the slide blocks 652 and 654 and secured to the cross straps 676 and 678 fastened to those arms. The traveling gear 672 also meshes with a sliding rack 680 fastened to the cross bars 644 and 646 of the carriage 638 and extending rearwardly beyond the rear cross bar 646 as illustrated in FIGURE 13. By virtue of this construction the slide carriage 638 advances and retracts in a ratio of 2 to 1 to the advancement and retraction of the traveling gear 672.

The peeling knife assembly 634 comprises a rod 682 threaded on its upper end through a pivot block 684 pivoted on a pin 686 in a position between parallel bars 688 welded to the opposite sides of an upstanding bar 690 fastened to the side bar 640 of the main carriage 638. A coil spring 692, coupled at one end to the upper end of the rod 682 and its other end to an adjustable pin 694 fastened to the upper end of the bar 690, urges the rod 682 in a clockwise direction about its pivot pin 686, as seen in FIGURE 14, thereby urging the rod toward a pear on the pear rotating and coring spindle 528.

A peeling knife gauge 696 is fastened to a bracket 698 supported on the rod 682 between adjustable clamping nuts 700. The knife gauge 696 is formed as a half section of a frusto-conical member having an integral tab for attachment to the bracket 698. A peeling knife 702 is also formed as a section of a frusto-conical, hardened, sheet metal member having its upper, semi-circular edge sharpened and extended beyond the lower edge of the gauge cone 696. The amount by which the knife edge projects beyond the gauge determines the thickness of the peeling removed from the pear. The knife 702 is formed with an integral arm 704 for attachment to the depending flange 706 of the bracket 698.

The peeling knife assembly 636 is essentially the same in structure as the peeling knife assembly 634 and comprises a rod 708 threaded through a block 710 pivoted on a pin 712 carried by spaced parallel bars 714 welded to an upstanding bar 716 fastened to the side bar 642 of the main carriage 638. A coil spring 718 secured at one end to the upper end of the rod 708 is secured at its other end to an adjustable pin 720 fastened to a plate 722 welded to the outer free ends of the bars 714. A knife gauge 724 and a knife 726 similar to the knife gauge 696 and the knife 702 are similarly mounted on a bracket 728 secured to the rod 708 between the clamping nuts 730.

The inward and outward radial movements of the peeling knife assemblies relative to the pear rotating and coring spindles 528 and 530 are controlled by a knife control slide 732. The slide 732 is supported upon a bar 734 welded to the lower end of the upright bar 716 and to the upright bar 736 which, in turn, is welded to a cross bar 738 and to a short bar 740. The bar 738 is welded at its opposite ends to the lower ends of the upright bars 690 and 716 and also to the short bar 740. The bar 734 also forms a guide for the inward and outward movement of the rods 682 and 708 radially of the pear rotating and coring spindles 528 and 530. For this purpose, the bar 734 is provided with slots, as 741, FIGURE 14A, through which the rods 682 and 708 pass so that as the rods are moved lengthwise of the bar 734 by the control slide 732 the rods move freely in such slots of the bar 734 in a direction perpendicular to the direction of travel of the carriage 638.

The slide 732 in the limit position shown in FIGURE 14 abuts rod 708 and when the slide moves to the right the rod 708 is moved radially outward relative to the axis of the pear rotating and coring spindle 530. The movement of the slide to the left to the position shown in FIGURE 14 is limited by the engagement of a pin 744, fastened to the slide, with the upright bar 716. The slide bar 732 is also formed with an elongated notch or groove 746 which receives the rod 682 so as to pull the rod 682 away from the axis of the pear rotating and coring spindle 528 when the slide bar moves to the right.

A cam roller 748 is journalled on a stud bolt 749 carried by the slide 732 and engages a knife control cam bar assembly 750. The cam bar assembly 750 comprises a cam bar 752 welded at its rear end to a cross bar 754, in turn welded to a longitudinal bar 756. The bar 756 is welded at its rear end to a block 758, in turn welded to a lever 760 pivoted as by a stud bolt 762 on the top rear wall of the main support casting 524. A cam roller 764 is mounted on a stud bolt 766 threaded into the block 758.

An adjustable cam bar 770 is mounted on the cam bar 752 adjacent its outer free end, the ends of the cam bars 752 and 770 being cut away or tapered as shown in FIGURE 14A. When the cam bar assembly 750 is moved to the right as seen in FIGURE 14 the slide 732 is moved to the right or "cocked" with the knives "lifted" from the spindles and the cam bar assembly is released to move to the left when the carriage 638 is in advanced position so that the peeling knives are moved by the springs 692 and 718 into engagement with the stem ends of the pears impaled butt end foremost on the pear rotating and coring spindles 528 and 530.

The cam bars 752 and 770 cause such movement of the slide 732 to the right in FIGURE 14 when the main carriage 638 is being retracted as to prevent the knives from gouging into the stem ends of the pears and to prevent the knives from striking the fins 536 in the absence of a pear on a pear rotating and coring spindle.

An adjustable set screw 772 threaded into main casting 524 and locked by a nut 774 acts as an adjustable limit stop for the cam assembly 750.

The cam roller 764 is actuated by an arcuate, external face, cam segment 776 secured to the outer face of cam disk 610. The set screws 772 is adjusted so that the cam roller 764 on inward movement of the cam assembly 750, as caused by the springs 692 and 718, lies in the path of the face cam 776 but clears the face of the edge-cam 608.

The stem and core ejector rods 548 for the peeling and coring spindles 528 and 530 are actuated in proper timed relation to the impalement of the pears on the spindles by the internal cam 664 through the cam roller 662 and the carriage actuating lever 658, it being noted that the lever 658 is secured at its lower end to the shaft 660 and that the shaft carries at one end an ejector actuating lever 778 fastened to the shaft. The lever 778 is connected by a strap 780 to the lever 782. Strap 780 is pivoted at its opposite ends to the levers 778 and 782 and the lever 782 is fastened at its upper end to a shaft 784 journalled in a suitable bushing, not shown, in the carriage mounting and guiding block 656. A lever 786, similar in form to the lever 782, is secured to the opposite end of shaft 784 and levers 782 and 786 are twisted intermediate their ends so that their lower portions lie in planes at right angles to their upper portions and those lower portions are formed with slots through which the stem ejectors 548 pass, the lower portions of the levers being received between spaced collars or washers 788 affixed to the inner ends of the stem ejector rods 548.

Each of the dual pear peeling and coring units 80 also includes dual pear seed celling mechanisms 790 and 792 and dual butt trimming mechanisms 794 and 796. Each of the seed celling mechanisms 790 and 792 comprises a part circular knife blade 798 mounted for advancement and retraction parallel to the axis of the associated pear rotating and coring spindle in close juxtaposition to the spindle shaft 540 and the fins 536.

Figure 13B:
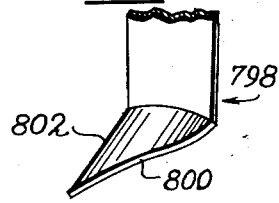
FIGURE 13B is a view in perspective partly broken away of a seed celling knife blade forming part of the peeling head unit.

The knife blade 798 is preferably formed as shown in FIGURE 13B with a spiral edge 800 sharpened at its end and a longitudinal sharpened edge 802 so as to penetrate into the butt end of each pear as it is rotating and form a seed cell containing cylinder or plug which remains attached to the body of the pear by a very small zone or area at the forward end of the fins 536.

The seed celling knife blades are secured as by welding or brazing to upstanding bars 804 secured as by screws 806 to the depending arms 808 and 810 of a slide carriage 812.

The butt trimming mechanisms 794 and 796 comprise trimming knife blades 814 and 816, each having a sharpened lower edge 818, FIGURE 13, so that the knife blades act to trim the butt ends of the pears down to the seed celling plugs formed by the seed celling knives. The trimming knives 814 and 816 are secured as by screws 820 to integral, lateral lugs (not shown) formed on mounting rods 822 and 824, the lower ends of the mounting rods being inwardly bent to support the knife blades. The upper end of mounting rod 822 is bent inwardly as at 826 and is pivotally received in the forwardly projecting flanges of a bracket 828 fastened to one end of the slide carriage 812. Collars 830 secured to the inturned end portion 826 of mounting rod 822 are positioned on opposite sides of one of the forwardly projecting flanges of the bracket 828 to hold the rod in adjusted position against movement radially of the pear rotating and coring spindle 528 while permitting the rod to pivot on bracket 828 in a direction substantially axially of the spindle so that the knife blade 814 is held in an adjusted radial position relative to the fins 536 but yet may move axially of the spindle.

A torsion spring 831 having one end secured in a suitable opening (not shown) in one flange of the bracket 828 has its other end secured in an opening (not shown) in the inner collar 830 so as to urge the rod and trimming knife blade in an outward direction and into engagement with a movement limiting flange 832 formed on the bracket 828.

The mounting rod 824 is similarly formed with an outwardly bent end portion 834 pivoted between the parallel flanges of a bracket 836 fastened to the other end of the slide carriage 812, and the rod 824 is similarly secured in adjusted position by collars 838 pinned thereto and lying on opposite sides of the outer flange of the bracket 836. Torsion spring 840, encompassing the end portion 834 and secured to the opposite flange of the bracket 836 and to the inner collar 838 urges the rod 824 into engagement with the movement limiting flange 842 of the bracket 836.

The slide carriage 812 comprises a pair of slide rods 844 and a cross bar 846 having the depending arms 808 and 810 and being secured to the forward ends of the slide rods as by screws 848 received in threaded openings in the ends of the rods. The rods are secured as by set screws 850 to a block 852 and the rods are slidably mounted in openings provided in the front web 854 of the main support casting 524 and in openings formed in a boss 856.

The block 852 is formed as part of a reciprocating yoke 858 overhanging the worm wheel 618 and having a depending arm formed at its lower end with a boss 860. A stud bolt 862 is mounted in the boss 860 and carries a yoke guiding and actuating cam roller 864. The cam roller 864 is received in a guiding slot 866 of a guide plate 868 fastened at its forward end to the main support casting 524 and supported at its other end on the outer end of the hub of the worm wheel 618.

The cam roller 864 projects beyond the inner face of the plate 868 for engagement with the cam 620. A carriage retracting spring 870 is secured at its forward end to a pin 872 carried by the slide block 852 and at its other end to a pin 874 threaded into the main support casting 524.

As the slide carriage 812 moves outwardly to project the seed celling knife into the butt end of a pear, the butt trimming knives and their mounting rods are first moved outwardly to engage, and trim the butt ends of the pears and are then swung inwardly in a direction generally axial of the pear rotating and coring spindles 528 and 530. The inward swinging is caused by rods 876 and 878 having end portions lying in the path of the mounting rods 822 and 824 and other portions adjustably threaded into a cross bar 880 welded to the block 572.

By the inward swinging of the butt trimming knives and their mounting rods, the knives and the inturned ends of the mounting rods cooperate with the knife carrying bars 804 to break through the skin-annuli trimmed from the butt ends of the pears so that the trimmings fall from the spindles into the waste trough 516.

The pear bobbing mechanisms

The dual power bobbing mechanisms 82, as best shown in FIGURES 17 to 19, comprise bobber knife blades 882 and 884 mounted on straps 886 and 888 fastened to bars 890 and 892 secured to the upper ends of levers 894 and 896 of bobber carriages 897 and 899. Gauge rods 898 and 900 are welded to a bar 902 adjustably fastened to the inturned end 904 of the bar 890, the rods 898 and 900 being spaced apart in a vertical plane sufficient to permit passage of the pear rotating and coring spindles 528 and 530 as the turret 442 rotates to position the spindles at the bobbing station.

A similar pair of gauge rods 906 and 908 are welded to a bar similar to the bar 904 and similarly adjustably fastened to the inturned end of the bar 892, rods 906 and 908 being similarly spaced to permit passage therebetween of the pear rotating and coring spindles 528 and 530.

The carriage 897 comprises in addition to the lever 894 a diverging bar 910 welded at its upper end to a point intermediate the ends of lever 894, the bars 894 and 910 being welded at their lower ends to a sleeve 912 journalled on a shaft 914 mounted in parallel arms 916 of a generally U-shaped bracket 918. The bracket 918 is welded to the upstanding arms 920 of a pivoted mounting frame, including in addition to the upright bars 920 a shaft 922. The arms 920 are welded to the shaft 922 and are also welded to an upper cross bar 924. The shaft 922 is pivoted in apertured plates 926 (only one being shown in the drawings) bolted to the lower upright frame members 6 and 8.

A connecting rod 928 is loosely received in and passes through an opening in a bar 930 welded to the bars 894 and 910 of the carriage 897 and the rod 928 also passes through an opening in an upstanding plate 932 welded to the cross bar 924 of the mounting frame. A sleeve 934 surrounds the rod 928 between the plate 932 and the bar 930 and a coil spring 936 encompasses the rod 928, the spring 936 abutting against the inner face of the plate 932 and against a nut 938 on the inner end of the rod. Adjusting and clamping nuts 940 on the outer end of the rod limit the inward movement of the rod relative to the bar 930. It will be evident that the rod 928 and spring 936 form a yieldable coupling between the bobber carriage 897 and the mounting frame. The bobber carriage 899 includes in addition to the lever 896 a bar 942 welded to the bar 896, the bars 896 and 942 being welded to a sleeve 944 also journalled on the shaft 914 but independently of the sleeve 912. A rod 946 and a coil spring 948 yieldably couples the mounting frame to the bobber carriage 899 in a manner similar to the coupling of the mounting frame with the bobber carriage 897.

The mounting frame is actuated first to position the bobbing knives and gauge rods for engagement by the stem ends of the pears as a dual pear peeling and coring unit is brought to the bobbing station and then to remove the knives from the path of the spindles of the pear peeling and coring unit as the turret carries the pear peeling and coring unit away from the bobbing station.

The actuating means for the bobber carriages comprises an adjustable link 950 pivoted at one end to a bar 952 welded to the bracket 918 and pivoted at the other end to a crank 954 secured to a shaft 956. The shaft 956 is journalled in a bearing block 958 carried at the upper end of a bar 960 fastened to the cross bar 26 and the cross bar 466. The shaft 956 is also journalled in a bearing block 962 fastened to the upright frame member 6 through which the shaft passes.

The shaft 956 is oscillated by a crank 964 secured to the shaft and having at its free end and a cam roller (not shown) engaging the internal cam track (not shown) of a cam 966 secured to a cam shaft 968 journalled in suitable bearing blocks (not shown) and driven from the Geneva crank shaft 500 through a bevel gear 970, FIGURES 9 and 11, secured to the shaft 500 and a meshing bevel gear 972 secured to the shaft 968.

*The pear clamping and discharge mechanisms*

The dual pear clamping and discharge mechanisms 84 comprise, as best shown in FIGURES 17 to 20, pear ejectors or strippers 974 and 976, FIGURES 17 and 19, fixed to a shaft 978. Each of the strippers 974 and 976 has a generally horizontal arm 980 extending inwardly from the shaft 978 and an upstanding pear engaging stripper or fork 982 having spaced finger portions or tines adapted to pass around the pear rotating and coring spindles 528 and 530 and to engage the butt end of a pear and push the pear outwardly and off the spindle upon outward movement of the pear ejectors.

The shaft 978 is fixed to the upstanding arms 984 and 986 of a pivoted frame or stripper carriage 987 which includes, in addition to the arms, a cross bar 988 welded to the arms 984 and 986, and a shaft 990 to which the bars 984 and 986 are welded at their lower ends. The shaft 990 is pivoted in suitable brackets 992 and 994 extending outwardly from and fastened to the upright frame bars 8 and 10.

A pear receiving discharge plate or trough 996 is fastened to and overlies the stripping arms 980 of the ejectors 974 and 976.

The stripper frame 987 is oscillated in and out to position the stripper forks 982 of the ejectors 974 and 976 in positions behind the pears on the pear rotating and coring spindles 528 and 530 as a pear peeling and coring unit is brought to the pear discharging station and to move the strippers outwardly to eject the pears from the spindles into the receiving trough and to carry the discharged pears in the trough 996 to a point of discharge. This oscillation of the stripper carriage is affected by an actuating mechanism which includes an adjustable link 998 pivoted at one end to the bar 984 and at its other end to one arm of a bell crank 1000 pivoted on a stud 1002 threaded into the plate 454.

An adjustable link 1004 is pivoted at one end to the other arm of the bell crank 1000 and at its other end to a crank 1006 secured to a shaft 1008. The shaft 1008 is journalled in the bearing block 958 and also in a bearing block 1010 fastened to the upright frame member 8. A crank 1012 secured to the free end of the shaft 1008 carries at its free end a cam roller 1014 which rides in an internal cam track formed in the inner face of a cam disk 1016. The cam disk 1016 is secured to one end of the cam shaft 968.

Dual pear clamps 1018 and 1020 are mounted upon a rock-shaft 1022. Each pear clamp is formed with a boss 1023 loosely journalled on the rock-shaft and an arm 1024 extending inwardly from the collar and carrying a clamping plate 1026 fastened thereto and formed with a plurality of depressed pear gripping fingers or corrugations 1028 adapted upon engaging the pear to act as a brake, stopping the rotation of the pear with the pear rotating and coring spindle. The pear clamps 1018 and 1020 are mounted on the rock-shaft 1022 between a collar 1030 secured to the shaft and a torsion spring 1032. Torsion springs 1032 are secured to the bosses 1023 and to collars 1034 adjustably secured to the rock-shaft 1022. The collars 1030 are formed with axially extending lugs 1036 adapted to engage axially extending lugs 1038 formed on collars 1023 of the pear clamps 1018 and 1020 so as to lift the clamps against the action of the torsion springs 1032 when the rock-shaft is oscillated in a clockwise direction, as seen in FIGURE 19, and permit the torsion springs to urge the clamps into pear clamping position when the rock-shaft 1022 and the collars 1030 are swung in a counterclockwise direction, as seen in FIGURE 19.

The rock-shaft 1022 is mounted in bearing blocks 1040 and 1042 fastened to upright frame bars 1044 and 1046 mounted at their lower ends on outwardly extending ends of the frame bars 24 and 28 which are joined at their outer ends by a cross bar 1048. The cross bar 1048 forms with the outwardly extended ends of the frame bars 24 and 28 an operator protecting frame around the pivoted stripper carriage and if desired a receptacle, not shown, for receiving pears from the discharge trough 996 may be suspended from the cross bar 1048. The clamp controlling rock-shaft 1022 is actuated through a crank 1050 secured to one end of the rock-shaft, the free end of the crank being connected by adjustable link 1052 to a crank 1054, the link being pivotally connected to the crank 1050 and to a lug 1056 upstanding from the crank 1054. The crank 1054 is secured to a short shaft 1058 journalled in a suitable bracket 1060 fastened to the upright frame member 8 and is oscillated through a crank 1062 keyed to the shaft and carrying at its other end a cam roller 1064 adapted to engage the external cam edge of a segmental cam 1066 fastened to the outer face of the cam disk 1016. A tension spring 1068 is secured at its upper end to the crank 1054 and at its lower end to the frame bar 26 so as to urge the crank 1054 in a clockwise direction, as seen in FIGURE 17.

A movement limiting bracket 1070 is fastened to the crank 1054 and is formed to provide spaced parallel arms 1072 and 1074 carrying adjustable stop screws 1076 and 1078 adapted to engage a flange of the upright frame member 8 and thereby limit the movement of the crank 1054, the stop screw 1078 serving to hold the cam roller 1064, against the action of the spring 1068, in a position to engage the cam segment 1066 and the stop screw 1076 serving to prevent the torsion springs 1032 from moving the clamping members into engagement with the pear rotating and coring spindles if no pears are positioned at the discharge station.

If it is desired to deliver half pears as the product of the machine rather than whole pears, it can be readily accomplished by providing the clamps 1018 and 1020 with suitable attaching lugs to which splitting knife blades 1080 and 1082 are secured and depend therefrom in the planes of the axes of the pear rotating and coring spindles and project between the tines of the stripper forks 982 so that as the strippers carry the whole pears off of the spindles they push the pears across the forwardly sharpened edges of the splitter blades and thereby bisect the pears along their stem axes.

It may be noted that the waste trough 516 is formed with a cut-out section 1084, FIGURES 18 and 20, at the discharge station, and a waste discharge chute 1086, FIGURE 11, fastened in a suitable manner to the bar 32, depends from the trough below the discharge opening 1084. A waste discharge feed paddle 1087 fastened to and extending radially of the turret disk 442, FIGURE 11, moves through the trough 516 as the turret rotates and carries the waste peelings and corings and butt trimmings along the trough until they reach the discharge opening 1084 and fall by gravity down the chute 1086 into a suitable waste receptacle, not shown.

Operation of the machine

The operation of the machine can best be described by reference to the timing diagrams of FIGURES 21 and 22, the timed relationships in FIGURE 21 being illustrated on the basis of one complete revolution of the main turret Geneva drive shaft 500 while the timed relationships illustrated in FIGURE 22 are based on one complete revolution of the main turret, it being evident that four revolutions of the main turret Geneva drive shaft, as shown in FIGURE 21, occur during one revolution of the main turret, as shown in FIGURE 22.

An operator places, simultaneously or substantially simultaneously, two pears with their butt ends down in the feed troughs 92 while the pusher blades 122 of the pear pusher 86 are at rest in "out" position, i.e., at the furthest distance from the center of the main turret. This takes place in Zone A of the pear pusher circle, FIGURE 21. The pears being deposited in the trough, the pear pusher 86 begins to move inwardly at 51° of the timing cycle and the pears are pushed along the troughs by the pear pusher blades 12. The pusher blades and the walls of the troughs cause the pears to pivot on their butt ends as they are moved along the trough, as described in our co-pending application, S.N. 526,877, filed August 8, 1955, until at 320° of the timing cycle the pears are positioned at the inner ends of the troughs with their neck ends projecting beyond the ends of the troughs and resting upon the lower straightener jaws 140.

The pear feed straightener jaws 90 which were "cocked" to the fruit receiving position between 143° and 158° of the timing cycle, now begin to close during Zone B of the feed straightener jaw cycle, the closing of these jaws being completed at 335° of the timing cycle. As the straightener jaws are closed, the lower jaws 140 turn the pears, their butt ends fulcruming on the troughs, by lifting of the necks of the pears into engagement with the oppositely moving upper jaws 138. Since the upper and lower jaws of each set rotate equal degrees about their respective pivot studs the stem axes of the pears are aligned in horizontal planes, and the jaws being V-shaped automatically center the stem axes of the pears with respect to predetermined vertical planes which are common to the spikes of the inverters 76.

While the straightener jaws are moving to closed position to rotate the pears in the feed troughs, the pear pusher is partially retracted or moved "out" to permit such turning of the pears while yet remaining in engagement with the butt ends of the pears to prevent the pears from being pushed backwardly or "out" by the closing jaws of the pear straighteners. This partial retraction of the pear pusher plates 122 begins at 320° and ends at 330° of the timing cycle and the pear pusher then remain at rest until at 340° of the timing cycle, it begins to move outwardly and reaches the outermost position, in which the pusher plates are at the outer end of the feed troughs, at 31° of the second timing cycle.

The straightener jaws 90 reach closed position sometime between 320° and 335° of the timing cycle and from that point to 350° of the timing cycle the jaws 138 and 140 remain at rest and closed upon the pears at the forward ends of the troughs. At 310° of the timing cycle the actuating link 356, for the transfer jaws 206—208, 214—216, begins to move downwardly, FIGURES 1 and 6, thereby permitting the closing of the transfer jaws 206, 208, 214 and 216. This closing of those jaws takes place in Zone C of the timing cycle of the feed transfer jaws or arms 206, etc. The timing of the closing of these jaws is, therefore, such in relation to the timing of the pear pusher and the feed straightener jaws that the pear pusher plates 122 have been moved outwardly partially but sufficiently to permit the butt jaws 206 and 208 to engage the butt ends of the pears and the neck jaws 216 to engage the neck ends of the pears behind the closed straightener jaws. From the 350° point of the timing cycle to a point at 45° of the second timing cycle, the feed transfer jaws remain at rest in closed positions upon the pears.

Beginning at a point of 355° of the timing cycle the feed transfer carriages, including the slide rods 226, 232, the cross bar 362 and the plate 364 and the interconnecting straps 366, begin to move inwardly to carry the pears in the transfer jaws 206, 208, 214, 216 from the inner end of the feed troughs on to spikes 394 of the inverters 76. Before these transfer carriages begin to move inwardly the transfer jaws have been moved to fully closed position and the straightener jaws 90 have begun to move to open position, the straightener jaws beginning to open at 350° of the timing cycle, and reaching fully open position at 8° of the second timing cycle, so as to clear the butt ends of the pears as they are carried by the transfer jaws of the moving transfer carriages toward spikes of the inverters 76. As the transfer carriages move inwardly to carry the pears to the inverters, the pear pusher is moving outwardly to receive the next pair of pears which are deposited in the feed troughs during Zone A of the second timing cycle.

As the feed transfer carriages move inwardly during Zone E of the first and second timing cycles, the transfer jaws carry the pears neck-end foremost onto those spikes 394 of the inverters 76 which are facing outwardly in substantially axial alignment with the feed troughs so that the spikes pass through, or substantially through, the pears along the stem axes thereof. It may be noted that the pear inverters 76 are at rest from the point of 335° of the first timing cycle to the point of 65° of the second timing cycle so that the spikes are at rest as the pears are moved from the feed troughs onto the spikes.

By the time the feed transfer carriages have completed their inward movement, at the point of 50° of the second timing cycle, the transfer jaws 206, 208, 214 and 216 have begun to open, that opening movement beginning at the point of 45° of the second timing cycle. The transfer carriages remain at rest in the inward position for a very short time, between 50° and 60° of the second timing cycle, and then begin to move outwardly while the transfer jaws continue to open so as to fully clear the pears on the spikes before the spike inverters 76 begin to move at 65° of the second timing cycle.

In Zone F of the pear inverter timing cycle, and from 65° of the second timing cycle to 335° of that cycle, the inverters rotate through 90° to position the pears on the spikes with their stem axes in vertical planes and with their butt ends up and beneath the pear positioners 412. Between 10° and 20° of the third timing cycle and while the inverters 76 are at rest, the pear pusher pads 414 of the pear positioners 412 are moved downwardly. They remain in downward position for 5° of the timing cycle and are then moved upwardly out of the path of the inverter spikes, the pear pusher pads 414 serving on downward movement to engage and move the pears, along the inverter spikes 394, radially inwardly toward the centers of the inverters so that the butt end of every pear, regardless of pear length, is positioned at a predetermined radial distance from the inverter axis. The pear positioner then remains at rest in upper position until 10° of the next or fourth timing cycle is reached.

During Zone F of the third timing cycle of the inverters, the pears are swung from the vertical position to horizontal, inverted positions in which the stem axes of the pears lie in horizontal planes with their butt ends facing "in," i.e., facing the pear rotating and coring spindles 528 and 530 of a peeling and coring unit positioned by the main turret at the receiving station.

As the inverters during the third timing cycle are moving the pears to inverted position, the transfer carriages reach their fully "out" position and remain at rest and the transfer jaws 210—212, 218—220, begin to close. During Zone C of the third timing cycle those transfer jaws quickly close upon the pears, after the inverters have been brought to rest. Beginning at the 355° point in the third timing cycle, the transfer jaws having been fully closed upon the pears before the point of 350° in the third timing cycle, the transfer carriages move through Zone E of the third and fourth timing cycles to extract the pears from the inverter spikes and carry them butt ends foremost to the pear rotating and coring spindles 528 and 530 of the dual peeling and coring unit. During such movement of the transfer carriages the main turret is at rest (Zone G of the fourth timing cycle).

Four timing cycles or revolutions of the drive shaft 500, upon which the timing diagram of FIGURE 21 is based, occur during each timing cycle or revolution of the main turret on which the timing diagram of FIGURE 22 is based. The 90° Zone G of the timing diagram of FIGURE 21 corresponds, therefore, to the 22° 30′ Zone H of the timing diagram of FIGURE 22.

The timing diagram of FIGURE 22 is explanatory of the operation of each of the four, dual, peeling head units but it should be borne in mind that while the operations illustrated in FIGURE 22 are being performed upon the pears on the peeling heads other operations, as explained in the timing diagram of FIGURE 21, are also being performed, such as bobbing, severing of the seed cell containing "plug" from the fruit bodies and the stripping or discharging of the fruit from the peeling heads.

As detailed in FIGURE 22, one of the four peeling heads will be positioned at the fruit receiving station and the turret at rest during the timing Zone H. During that time zone the peeling knife carriage 638, the stem ejectors 548, the seed cell knives 790 and 792 and the butt trim knives 814 and 816 are at rest in retracted positions; the peeling spindles 528 and 530 are stationary and the knife lifter 750 is at rest in "cocked" position holding the peeling knives 634 and 636 in inward positions furthest from the axes of peeling spindles 528 and 530. When the timing point of 22° 30′ has been reached, and the turret begins to turn, the transfer carriages have been advanced toward the turret to place the pears on the spindles, the transfer jaws have been opened to release the fruit to the spindles and the transfer carriages have moved rearwardly or "out" sufficiently to clear the path of the spindles. This movement of the turret carries the peeling head to an intermediate station from the receiving station and the movement of the turret is completed at the 90° timing point. It will thus be clear that the turret is moving during periods three times as long as its rest periods. This speeds up the conveying of the fruit from the receiving station to the discharging station.

Shortly after the turret begins to move the peeling head toward the intermediate station, the peeling knife carriage 638, at 28° 15′, begins to advance, or move "out," at a rapid rate, which is twice the rate of travel of the traveling gear 672 caused by the cam controlled, counterclockwise movement of the lever 658, as seen in FIGURE 13. At the same time as the knife carriage is advanced the stem ejectors 548 are advanced or moved "out" to eject from the spindles 528 and 530 the stems and cores severed from the bodies of the pears by the coring tubes 532.

At the timing point of 41° 30′, and while the knife carriage is being advanced, the cam segment 608 passes the cam roller 606 and the spring 590 thereupon causes engagement of the clutch parts 582, 584 and 586 and the consequent rotation of the pear rotating spindles 528 and 530. It may be here noted that such rotation of the spindles continues to the timing point of 356° 30′. It will, therefore, be evident that rotation of the fruit continues during the dwell periods of the turret as well as during its moving periods.

At the timing point of 64° 15′ the knife carriage 638 has completed its "out" movement to outermost position and the knives therefore are positioned beyond the stem ends of the pears impaled on the spindle. The knife carriage remains at rest in that outward position for a very short time and until the timing point of 68° 15′.

While the knife carriage is at rest in outward position, the knife lifter is "tripped" as the cam 776 passes the cam roller 764, at the timing point 66° 15′; and the knife springs 692 and 718 swing the knives inwardly toward the axes of the spindles until the stop pin 744 engages the upright bar 716. The knives are thus positioned for peeling engagement with the stem ends of the pears as the carriage 638, at the timing point 68° 15′ begins to move inwardly at a relatively rapid rate.

It may be here noted that the knife carriage 638 moves inwardly at the relatively rapid rate, determined by a "⅜ inch lead" portion of its actuating cam from the timing point 68° 15′ to the timing point 230° 45′ during the main portion of the peeling operation and then travels inwardly at a slower rate, determined by a "¼ inch lead" portion of its actuating cam, while the peeling knives traverse the butt ends of the pears.

The lifter for the peeling knives remains tripped, and the peeling knives in engagement with the rotating pear until the timing point 250° is reached, at which timing point the cam segment 776 re-engages the cam roller 764 and swings the cam bar assembly 750 in a direction to move the slide bar 732 to the right, as seen in FIGURE 14, and thereby lift the peeling knives out of engagement with the pears and "cock" the knife lifter.

At the timing point of 191° 15′ the slide bar 846 begins to move outwardly under the action of the cam 620 and this causes the butt trim knives 814 and 816 to begin to move or travel out and at the timing point of 192°, the seed cell knives 790 and 792 begin to move or travel out. As the seed cell knives travel outwardly, they penetrate into the pears in close juxtaposition to the fins of the pear rotating and coring spindles to form seed cell plugs which remain attached to the pears at the forward end of the spindle fins. As the butt trim knives move outwardly, they engage the butt ends of the pears at predetermined distances from the axes of the spindles and trim or peel from the butt ends of the pears waste or peeling annuli of radii determined by the radial distances of the foremost edges of the butt trimming knives from the spindle axes.

As the slide bar 846 continues to move outwardly, and at the timing point 225°, the mounting rods 822 and 824 of the butt trim knife assemblies contact the inturned ends of the rods 876 and 878 and further movement of the slide bar, therefore, causes the butt trim knives to move or travel in, as illustrated in FIGURE 13, and thereby, in cooperation with the outwardly traveling shanks 804 of the seed cell knives, to break through the butt trimmed peeling annuli which, therefore, drop down into the waste trough.

At the timing point of 258° 30′ this outward travel of the slide bar 846 ceases and it remains in that "out" position to the timing point of 285° at which point the slide bar 846 begins to move inwardly under the action of the cam 620, thereby withdrawing the seed cell knives from the pears.

At the timing point 258° 30′ on the timing diagram of FIGURE 22, the main turret crank shaft has rotated through substantially 2⅔ revolutions from the starting point at which the peeling and coring head began to move from the fruit receiving position and, therefore, the turret at that time is just moving the peeling and coring head into position at the discharge station. Before that time, however, and when the turret has been rotated through 180°, the pear peeling and coring head, the operation of which is being described, has been positioned at the bobbing station where it remains at rest until the timing point of 202° 30′ is reached. As the turret is revolving to the 180° position in FIGURE 22, the bobber carriages 897 are moved to their innermost positions by the cam 966 and are at rest in those positions before the peeling head on the moving turret reaches the bobbing station. This will be seen from FIGURE 21 which shows that the bobber carriages begin to move inwardly at 298° on the timing cycle and reach fully in positions at 339° on the timing cycle. Interpolated with reference to FIGURE 22, this means that the bobber carriage at 5° 15′ before the peeling unit arrives at the bobbing station is moved inwardly to its innermost position and the gauge rods 898, 900, 906 and 908 are positioned to engage the stem ends of the pears as the peeling head approaches the rest position at the bobbing station. This engagement of the pears with the gauge rods causes the carriages 897 and 899 to move outwardly individually and against the action of the springs 936 and 946 so that the bobbing knives 882 and 884 are thereby positioned to engage and cut or "bob" predetermined lengths off the stem ends of the pears as the rotating pears are carried across the faces of the bobbing knives by the moving turret distances substantially equal to the radial depths of the neck ends of the pears.

The bobber carriages remain at rest in their inner position to the timing point of 40° 15′ in FIGURE 21 and are then moved outwardly by the cam 966 to remove the bobbing knives from the paths of the pear rotating and coring spindles. Interpolated with reference to FIGURE 22, this means that the bobber carriages move outwardly at approximately 10° after the turret has come to rest at the bobbing station and before it next begins to move at 202° 30′ in FIGURE 22.

When the turret is rotated through 270°, as indicated in FIGURE 22, the peeling and coring unit is brought to the discharge station where it remains until the timing point of 292° 30′ is reached. At the timing point of 285° in FIGURE 21, the stripper carriage 987 begins to move inwardly and reaches its full inward position at 334°. Interpolated with reference to FIGURE 22, this means that at 6° 15′ before the peeling and coring unit reaches the discharge station, the stripper carriage has been positioned at its innermost position and the stripper forks 982 are positioned radially inward of the paths of the butt ends of the pears. As the peeling heads approach the discharge station, the spindles 528 and 530 pass over the short tines of the stripper forks and are in close juxtaposition to the long tines of the forks.

At the timing point of 355° in FIGURE 21, the pear clamps or holders 1018 and 1020 are swung downwardly by the torsion springs 1032 under the control of the cam segment 1062. Some time between the timing points of 355° and 5°, as shown in FIGURE 21, the pear clamps engage the pears and stop their rotation. Interpolated with reference to FIGURE 22, this means that the pear clamps or holders 1024 engage the pears just as the peeling and coring head comes to rest at the discharge station. At that time the peeling spindles are still rotating, as indicated in FIGURE 22, and the fins on those rotating spindles cause the seed cell plugs formed by the seed celling knives 790 and 792 to be broken or severed from the main bodies of pears, thereby completing the seed celling operation.

At 34° on the timing cycle, shown in FIGURE 21, the stripper carriage 987 begins to move out or travel outwardly causing the stripper or discharge forks 982 to engage the butt ends of the pears and push the pears off the spindles onto the receiving trough or plate 996 which is moving outwardly with the stripper forks. This outward movement of the stripper carriage is completed at the timing point of 94°, as shown in FIGURE 21. Interpolated with reference to FIGURE 22, this means that the stripper carriage begins to move outwardly at 8° 30′ after the peeling and coring unit arrives at the bobbing station and completes its outward movement at 23° 30′ after the peeling and coring unit has come to rest at the bobbing station so that at the time the turret begins to move to carry the peeling and coring unit back to the fruit receiving station the stripper forks pass beyond the ends of the spindles 528 and 530.

It should be noted that four cycles of operations diagrammed in FIGURE 21, occur during one cycle of operations diagrammed in FIGURE 22 and that at any one instant when one dual pear peeling and coring head is at the receiving station to receive two pears, two preceding pears are being peeled, two are being bobbed, but trimmed and partially deseeded and two others are being subjected to final deseeding operations and to discharge from the machine.

In peeling certain varieties of pears the non-rotating peeling knives 634 and 636 while producing pears satisfactory for fruit cocktail purposes may produce unsightly ridges reducing the appearance-quality of those varieties of pears. For the processing of such pears, and in any case where the highest appearance-quality is desired while still maintaining a high tonnage output to input ratio, the peeling head may be provided with a "live" peeling knife, as illustrated in the modification shown in FIGURES 23 to 28. As shown in these figures, each peeling knife 1100 is in the form of an inverted frusto-conical member having its upper periphery sharpened to a peeling edge projecting radially a slight distance beyond the lower edge of a cutaway, frusto-conical, depth gauge 1102. The knife 1100 is formed with a depending hub 1104 pinned to a vertical shaft 1106 and the gauge 1102 is formed with a hub portion 1108 pinned to a sleeve 1110, the shaft 1106 being journalled by suitable bushings in the sleeve 1110. The sleeves 1110 for the dual peeling knives 1100 of each peeling head are mounted or secured in pivoted knife mounting blocks 1111, similar to the blocks 684 and 710, and the shafts 1106 project above the blocks for attachment by the usual couplings to flexible shafts 1112. The other ends of the flexible shafts are detachably secured in the usual manner to stud shafts 1116, journalled in brackets 1117, and secured by nuts 1118 to mounting plates 1120 fastened or welded to the upstanding arms 652 and 654 of the mounting blocks 656 of the peeling and coring heads. Gears 1122 secured to shafts 1116 mesh with each other, in pairs, and one of each pair meshes with a gear 1124 secured to the upper end of a shaft 1126. Shaft 1126 is connected by a suitable coupling 1128 to the upper end of the peeling head drive shaft 472 and is journalled in a suitable bearing block 1130 fastened to a mounting plate 1132 welded to the upper end of posts 1134 fastened to brackets 1136 carried by the turret disk 442. Thus in the embodiment, shown in FIGURES 25 to 30, the peeling knives 1100 are moved inwardly and outwardly parallel to the fruit rotating and coring spindles by the carriage 638 and are rotated continuously by the shaft 472 so as to perform a live peeling operation upon the pears when the knives are permitted by the cam assembly 750 to move into engagement with the pears at the stem end and are moved along the pears from stem to butt end as the carriage 638 is moved inwardly or retracted. Coil springs, as 1138, connected between the sleeves 1110 and the upright bars 690 and 716 urge the knives 1100 and gauges 1102 into engagement with the pears when the slide bar 732 permits such movement.

Having thus described the invention, what we claim as new and desire to secure by Letters Patent is:

1. In a pear preparation machine, the combination of an intermittently rotatable carrier, a plurality of fruit supporting spindles mounted in spaced relation on said carrier, said carrier successively positioning said spindles at a receiving station, a bobbing station and a discharge station, means for feeding pears onto the spindles when positioned at the receiving station, means for rotating said spindles during the indexing and dwell of said carrier, a plurality of continuous peeling knife units one for each spindle and mounted on said carrier for movement with said spindles continuously to peel the pears on the spindles during successive index and dwell periods of the carrier, means at the bobbing station for bobbing a pear undergoing peeling on a rotating spindle as the carrier indexes a spindle to the bobbing station, discharge means for moving the peeled and bobbed whole pears from the spindle when the spindle is positioned by the carrier at the discharge station, and means rendering the spindle rotating means ineffective to rotate a spindle when positioned by the carrier at the receiving station.

2. A fruit preparation machine as set forth in claim 1, including in combination a plurality of seed celling knives, one for each of said spindles and mounted on said carrier for movement axially of the associated spindle into a pear from the butt end thereof as the spindle is rotated thereby to form a seed cell containing plug, means on each spindle for causing said plug to rotate with the spindle, means actuated in timed relation to said seed celling knives and the carrier to stop rotation of the pear with the spindle and thereby break the seed cell plug from the pear.

3. In a fruit preparation machine as set forth in claim 1, including in combination butt trimming knives, one for each of said spindles and mounted on said carrier for movement to and fro axially of the spindle to engage and trim the butt end of each pear as it rotates with its spindle.

4. In a fruit preparation machine as set forth in claim 1, a pear splitting knife at the discharge station and aligned with the axis of each spindle as the spindle is positioned by the carrier at the discharge station to split each pear as it is removed by the discharge means from the spindle.

5. In a fruit preparation machine as set forth in claim 1, wherein the feeding means comprises an arcuate trough for receiving seriatim pears to be processed, pear pusher means actuated in timed relation to said carrier and mounted for reciprocation in said trough to engage the bulb ends of pears inserted in said trough and feed them neck end foremost to the discharge end of the trough, pear inverting means actuated in timed relation to said carrier, and transfer means actuated in timed relation to said carrier for carrying pears from the discharge end of the trough to the pear inverter means neck end foremost and from the pear inverter means bulb end foremost onto a spindle positioned at the receiving station.

6. In a pear preparation machine, the combination of an intermittently rotatable carrier, a plurality of fruit receiving units mounted in spaced relation on said carrier, each of said units comprising a support secured to said carrier, a pair of fruit receiving spindles rotatably mounted on said support, said carrier successively positioning the fruit receiving units at a receiving station, a bobbing station and a discharge station, means for feeding pears two at a time onto the spindles of a unit positioned at the receiving station, means for rotating said spindles, a pair of continuous peeling knife mechanisms for each fruit receiving unit and mounted on the unit support for movement with the unit continuously to peel the pears on the two spindles of the unit during the rotation of the spindles, means at the bobbing station for simultaneously bobbing the pears on the two rotating spindles of a unit as the carrier in moving causes a unit to approach the bobbing station, discharge means for moving the peeled and bobbed whole pears from the two spindles of a unit when the unit is positioned by the carrier at the discharge station, and means for driving said carrier, said feeding means, said spindle rotating means, said peeling knife mechanisms, said bobbing means and said discharge means in timed relation.

7. In a fruit preparation machine as set forth in claim 6 wherein the feeding means comprises a pair of arcuate troughs positioned for the simultaneous insertion of two pears bulb ends down, pear pusher means actuated in timed relation to said carrier and including two pusher plates mounted for reciprocation in said troughs to engage the bulb ends of pears inserted in said trough and simultaneously feed them neck ends foremost to the discharge ends of the troughs, pear inverting means actuated in timed relation to said carrier, and transfer means actuated in timed relation to said carrier for simultaneously carrying the two pears from the discharge ends of the troughs to the pear inverter means neck ends foremost and two pears from the pear inverter means bulb ends foremost onto the two spindles of a unit positioned at the receiving station.

8. In a pear peeling mechanism, a support, a plurality of pear impaling spindles rotatably mounted upon said support for rotation about substantially parallel axes, a carriage slidably mounted upon said support for movement substantially parallel to said spindles, a plurality of peeling knives, one for each of said spindles, shiftably mounted on said carriage for movement toward and from the axes of the spindles, means for urging each of said knives toward the axis of the associated spindle, a common actuating bar slidably mounted upon said carriage for movement transverse to the spindle axis and operatively connected to said knives for moving said knives away from the spindle axes, a control bar carried by said support and extending therefrom for engagement with the actuating bar to hold the knives clear of the pears on movement of the carriage in one direction and to release the knives for inward movement by the urging means on movement of the carriage in the other direction, a driving mechanism for rotating said spindles, and means connected to said driving mechanism for reciprocating said carriage.

9. In a pear peeling mechanism as set forth in claim 8, including a second carriage slidably mounted upon said support for movement substantially parallel to said spindle, a plurality of butt trimming knives, one for each of said spindles, and mounted on said carriage to extend radially of the spindles, means connected to said driving mechanism for reciprocating said second carriage in timed relation to the first carriage.

10. In a pear peeling mechanism, a support, a spindle rotatably mounted upon said support, a carriage slidably mounted upon said support for movement parallel to the spindle, a peeling knife shiftably mounted on said carriage for movement therewith along the spindle and for movement radially of the spindle for peeling engagement with a pear impaled on the spindle, a rack carried by said carriage, a fixed rack carried by said suppport and extending parallel to the carriage rack, a traveling gear meshing with both racks, driving mechanism for rotating the spindle, a cam connected to said driving mechanism, a lever pivotally mounted on said support and carrying a roller for engaging said cam, a bar secured to said lever for movement therewith, and said traveling gear being secured to said bar.

11. In a pear peeling mechanism, a support, a pear impaling stemming tube rotatably mounted on said support, reciprocating carriage means mounted on said support, a peeling knife shiftably mounted on said carriage means for movement along the spindle and for movement radially of the spindle into peeling engagement with a pear on the spindle, butt trimming knife means mounted on said carriage means and extending radially of the spindle to engage and trim the butt end of a pear on the spindle, and a seed celling knife mounted on the carriage for projection into the butt end of a pear to seed cell the pear on the spindle, and means for rotating the spindle and for reciprocating said carriage means.

12. In a pear peeling mechanism as set forth in claim 11, wherein said seed celling knife comprises an arcuate blade partially circumscribing the spindle and extending along the spindle and non-rotatably secured to the carriage means.

13. In a pear peeling mechanism as set forth in claim 11, a stem ejector rod slidably mounted in the spindle and projecting therefrom, and cam actuated means connected to said driving mechanism and the projecting end of said stem ejector for reciprocating said ejector in said stemming tube in timed relation to the reciprocation of said carriage means.

14. In a pear preparation machine having a carrier and a pear impaling member mounted on said carrier for movement therewith and for rotation relative thereto, a bobbing mechanism comprising a shiftable support, a bobbing knife mounted on said support, means for moving said support to position the bobbing knife in the path of an impaling member as the member is brought by the carrier to the bobbing station to bob the end of a pear rotating with said member, and pear engaging means carried by said shiftable support into engagement with the stem end of the pear on the impaling member as it is brought to the bobbing station to position the bobbing knife a predetermined distance from the end of the pear, and means for actuating said support to remove the bobbing knife from the path of the impaling member as the carrier carries the impaling member past the bobbing station.

15. In a pear preparation machine having a carrier and a pear impaling stemming tube mounted on said carrier for movement therewith and for rotation relative thereto, a bobbing mechanism comprising a shiftable support, a bobbing knife fixed on said support, means for moving said support toward the carrier to position the bobbing knife in the path of an impaling member as it is brought to the bobbing station by the moving carrier, a gage member mounted on said support in predetermined spaced relation to said knife to engage the stem end of a pear on the stemming tube as the carrier brings a rotating pear on the stemming tube to the bobbing station and cam means for moving said support away from said carrier to move the bobbing knife from the path of the stemming tube as the carrier moves the impaling member past the bobbing station.

16. In a pear preparation machine having an intermittently rotating turret and a pear impaling spindle rotatably mounted on said turret, a bobbing mechanism comprising a shiftably mounted support at one of the turret stations, a bobbing knife fixed to said support, spring controlled cam actuated means for moving said support toward the turret to position the bobbing knife in the path of a spindle on the turret as the turret brings the spindle to the bobbing station with the spindle abutting the bobbing knife, and a gage member fixed to said support in position to engage the pear on the spindle as the spindle on movement of the turret approaches the bobbing station to limit the movement of the bobbing knife in accordance with the length of the pear, said cam actuated spring control means including means for moving the support away from the turret to clear the path of the spindle for further movement with the turret.

17. In a pear preparation machine having a turret and a pear impaling spindle rotatably mounted on said turret to extend transverse to the axis thereof, a bobbing mechanism comprising a support arm shiftably mounted for movement toward and from the axis of the turret, a carriage pivotally mounted on said support arm for movement therewith and relative thereto, spring means resisting pivoting of said carriage on said support arm as said support arm moves inwardly of the turret, a pair of gage rods mounted on said carriage in spaced relation to receive between them a pear impaling spindle as the spindle is carried by the turret to a bobbing station, the rods being spaced sufficiently to pass a spindle but engage the stem end of a pear on the spindle and cause pivoting of the carriage on the support arm as the spindle approaches the bobbing station, a bobbing knife fixed on said carriage a predetermined distance inwardly of the gage rods toward the axis of the turret and positioned to substantially abut the surface of the spindle when the spindle reaches the bobbing station, and cam actuated control means operatively connected to said support arm to urge said arm inwardly of the turret as the spindle approaches the bobbing station and for actuating the support arm and the carriage in timed relation to the subsequent movement of the turret to remove the bobbing knife from the path of the spindle as the spindle moves with the turret away from the bobbing station.

18. In a pear preparation machine, an intermittently moving carrier, a plurality of coring units mounted on said carrier in spaced relation, each of said units including a pear impaling coring tube rotatably mounted on the carrier and having a plurality of radially extending fins for engaging the seed cell section of a pear impaled on the tube, each of said units including an arcuate knife blade mounted for movement longitudinally of the tube into the butt end of a pear on the tube to a position circumscribing the fins on the tube, a pear penetrating member positioned along the path of the carrier successively to engage the pears on the tubes of successively presented units when the carrier is stationary, means for rotating the tubes in timed relation to the movement of the carrier and means operatively connected to said rotating means for actuating said penetrating member into engagement with the pears while the tubes are rotating to sever the seed cell plugs formed by the arcuate knives from the bodies of the pears.

19. In a pear preparation machine, a pair of substantially parallel horizontal feed troughs for receiving pears two at a time, a reciprocating pear feeder having pear pushers mounted for movement along the troughs to push the pears neck end foremost from the receiving to the discharge end of the troughs, a pair of intermittently rotating members having radial spikes rotating in vertical planes coplanar with the axes of the troughs, an intermittently rotating turret rotating on a vertical axis, a plurality of combined peeling and coring units mounted on said turret, each of said units comprising a pair of spaced parallel and rotatably mounted pear impaling stemming tubes positionable by the turret at a receiving station with the free ends of the tubes substantially in the same vertical planes as the axes of the troughs, dual sets of transfer mechanisms operatively interconnected for simultaneously carrying pears neck end foremost from the discharge ends of the trough to those spikes of the inverter facing the troughs and pears butt end foremost from the oppositely facing spikes of the inverter onto the impaling tubes, each of said units including a support detachably secured to the turret and upon which the tubes are rotatably mounted, common drive mechanism for rotating the stemming tubes of all the pear peeling and coring units, each pear peeling and coring unit including a cam actuated clutch means for rendering the drive mechanism ineffective to rotate the stemming tubes when the unit is positioned at the receiving station, each pear peeling and coring unit also including a pair of peeling knives, a pair of butt trimming knives and a pair of seed celling knives shiftably mounted upon the unit support and operatively connected to the drive mechanism for actuation in timed relation to peel, butt trim and seed cell the pears impaled on the tubes of the unit, a pair of bobbing mechanisms including a pair of supports shiftably mounted for independent movement, bobbing knives fixed to each of said supports, means for simultaneously moving the supports toward the axis of the turret in timed relation to the movement of the turret to position the bobbing knives in the path of a pair of stemming tubes of a pear peeling and coring unit as the unit is brought to the bobbing station, gage means carried by each of said shiftably mounted supports and spaced from the bobbing knives to engage the pears as the stemming tubes of a unit approach the bobbing station to position the bobbing knives a predetermined distance from the ends of the pear regardless of the lengths of the individual pears, and means for moving the shiftably mounted supports away from the axis of the turret in timed relation to the movement of the turret to remove the dual bobbing knives from the path of the stemming tubes of a peeling and coring unit as the turret moves the unit away from the bobbing station.

20. A pear preparation machine as set forth in claim 19, including a support shiftably mounted for movement toward and from the turret axis at a discharge station, a pair of fruit discharging pads mounted on said support for positioning on inward movement of the support to engage the inner ends of the pears on the tubes of a unit at the discharge station and on outward movement of the support to discharge the pears from the tubes of the unit and actuating means for moving said support inwardly and outwardly in timed relation to the movement of the turret.

21. A pear preparation machine as set forth in claim 20, including a pair of pear gripping pads shiftably mounted at the discharge station for positioning to engage and grip pears on the rotating tubes of a unit when brought to said station, spring means for moving said pads toward the tubes into gripping relation with the pears on the tubes, actuating means for controlling said spring means and for moving said gripping pads away from said tubes to release the pears for discharge by the discharge pads, and means interconnecting the two actuating means for actuating and controlling the movement of said gripping pads in timed relation to the inward and outward movement of the discharge pads support.

22. In a pear preparation machine, a vertical sleeve, a horizontal turret secured to the upper end of said sleeve, a drive shaft extending through said sleeve, a plurality of combined pear peeling and coring units mounted on said turret, each of said units comprising a stemming tube and a support secured to the turret and upon which the tube is rotatably mounted, a gear secured to said shaft, each of said units including a driven shaft, having a gear thereon meshing with the gear on the drive shaft, drive mechanism including means for intermittently rotating said sleeve and means for continuously rotating said drive shaft, said turret successively positioning the peeling and coring units at a receiving station, a bobbing station and a discharge station, each of said units including a peeling knife carriage slidably mounted on said support for movement substantially parallel to the stemming tube, a peeling knife shiftably mounted on said carriage for movement with the carriage and for movement transversely of the tube to engage and peel a pear on the tube as the tube is rotated, means connecting said carriage and said peeling knife to said driven shaft for reciprocating said carriage and controlling the transverse movement of the peeling knife, said connecting means including a cam actuated clutch operatively connected to said driven shaft and to said tube for rendering said driven shaft ineffective to rotate the stemming tube of a unit when positioned at the receiving station, means for feeding a pear onto the stemming tube of a unit at the receiving station, means at the bobbing station for bobbing a pear on the tube of a unit at that station, means at the discharge station for removing a peeled and cored pear from the stemming tube of a unit at that station, and means connecting said feeding means, said bobbing means and said discharge means with said driving mechanism for actuating said feeding means, said bobbing means and said discharge means in timed relation with said turret.

23. A pear preparation machine as set forth in claim 22, wherein each pear peeling and coring unit includes a block shiftably mounted upon the peeling knife carriage and the peeling knife is rotatably mounted in said block for rotation relative to the carriage and the stemming tube and for movement with the block transverse to the tube, and drive means connecting the rotating knives of all the units to said drive shaft.

24. In a pear preparation machine, a carrier, a plurality of fruit receiving spindles mounted in spaced relation on said carrier, a pear peeler mounted on said carrier and operatively associated with each spindle, and means for feeding pears individually onto said spindles, said feeding means comprising a fruit impaling member, butt engaging means operatively associated with said impaling member and shiftable longitudinally thereof for positioning the butt end of each pear at a predetermined point on the impaling member, and means for transferring the pears from the impaling member to the spindles with the butt ends always in the same position lengthwise of the spindles.

References Cited in the file of this patent

UNITED STATES PATENTS

| | | |
|---|---|---|
| 287,601 | Wilcox | Oct. 30, 1883 |
| 321,667 | Wilcox | July 7, 1885 |
| 1,374,899 | Baker | Apr. 19, 1921 |
| 2,056,413 | Thompson et al. | Oct. 6, 1936 |
| 2,085,225 | Lucks | June 29, 1937 |
| 2,134,955 | Risser | Nov. 1, 1938 |
| 2,255,048 | Ewald | Sept. 9, 1941 |
| 2,418,827 | Ewald | Apr. 15, 1947 |
| 2,429,991 | Coons | Nov. 4, 1947 |
| 2,581,732 | Thompson | Jan. 8, 1952 |
| 2,742,067 | Coons et al. | Apr. 17, 1956 |
| 2,786,564 | Clarke et al. | Mar. 26, 1957 |